US012003346B2

(12) United States Patent
Liu et al.

(10) Patent No.: US 12,003,346 B2
(45) Date of Patent: Jun. 4, 2024

(54) SYSTEM AND METHOD FOR DUAL-PORT COMMUNICATION AND POWER DELIVERY

(71) Applicant: Maxim Integrated Products, Inc., San Jose, CA (US)

(72) Inventors: Wuguang Liu, Beijing (CN); Stewart Merkel, Frisco, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 675 days.

(21) Appl. No.: 17/132,340

(22) Filed: Dec. 23, 2020

(65) Prior Publication Data
US 2021/0218595 A1 Jul. 15, 2021

Related U.S. Application Data

(60) Provisional application No. 62/960,580, filed on Jan. 13, 2020.

(51) Int. Cl.
*H04L 12/40* (2006.01)
*G06F 1/26* (2006.01)
(Continued)

(52) U.S. Cl.
CPC ........ *H04L 12/40045* (2013.01); *G06F 1/266* (2013.01); *G06F 13/4027* (2013.01);
(Continued)

(58) Field of Classification Search
CPC ........ G06F 1/266; G06F 5/16; G06F 13/4004; G06F 13/4027; G06F 13/4059;
(Continued)

(56) References Cited

U.S. PATENT DOCUMENTS 5,862,354 A * 1/1999 Curiger ................. G06F 13/385
710/110
5,994,770 A * 11/1999 Harrington .............. G11C 8/20
257/730

(Continued)

FOREIGN PATENT DOCUMENTS

CN 203870609 U 10/2014

OTHER PUBLICATIONS

Markel, Stewart. "Reference Design of a 1-Wire® Bidirectional Voltage Level Translator for 1.8V to 5V". Reference Schematic 4477. Nov. 11, 2009. Maxim Integrated Products, Inc. (Year: 2009).*

(Continued)

*Primary Examiner* — Thomas J. Cleary
(74) *Attorney, Agent, or Firm* — North Weber & Baugh LLP; Michael North

(57) ABSTRACT

Described herein are embodiments for dual-port communication and power delivery for one-wire applications. Embodiments of one-wire bridge devices are disclosed to provide a dual-port link for two one-wire masters to communicate with one another in a multi-voltage system while intermittently allowing charging voltage. The configuration may be used to set a bidirectional pass through mode that allows level shifted fast logic signals to pass through the two one-wire links. A timer may also be configurable to time-out the pass through mode from edge in-activity. Power may be derived for operation directly from one of the links, eliminating the need for an external power supply when local power is not available. When local power is available, the other one-wire link provides local access and the pass through mode. Such configurations make it easy for a two-contact solution to be both a communication channel and a power supply for battery charging.

19 Claims, 15 Drawing Sheets

(51) Int. Cl.
  *G06F 13/40* (2006.01)
  *H02J 7/00* (2006.01)
  *H04B 3/54* (2006.01)
(52) U.S. Cl.
  CPC .......... *G06F 13/4059* (2013.01); *H02J 7/007* (2013.01); *H04B 3/548* (2013.01); *H04L 12/40032* (2013.01); *H02J 2310/22* (2020.01)
(58) Field of Classification Search
  CPC .......... G06F 13/4282; H04L 12/40032; H04L 12/40045; H02J 7/007; H02J 2310/22; H02J 7/0044; H02J 7/342; H02J 7/00034; H04B 3/548
  See application file for complete search history.

(56) References Cited

U.S. PATENT DOCUMENTS

| | | | |
|---|---|---|---|
| 7,099,970 B1* | 8/2006 | Foegelle | G06F 13/38 710/110 |
| 7,782,240 B2 | 8/2010 | Ng et al. | |
| 8,898,356 B2 | 11/2014 | Julicher et al. | |
| 10,983,942 B1* | 4/2021 | Ngo | H04L 69/08 |
| 2001/0009361 A1* | 7/2001 | Downs | H02J 7/04 320/132 |
| 2002/0101884 A1* | 8/2002 | Pohlmeyer | H04L 7/044 370/510 |
| 2014/0129738 A1* | 5/2014 | Hussain | G06F 1/1632 710/8 |
| 2015/0117463 A1* | 4/2015 | Nelsen | H04L 12/4625 370/402 |
| 2019/0042514 A1 | 2/2019 | Enamandram et al. | |
| 2020/0151125 A1* | 5/2020 | Ngo | H04B 1/3805 |
| 2020/0334185 A1* | 10/2020 | Ngo | G06F 13/362 |
| 2020/0344094 A1* | 10/2020 | Mishra | H04L 12/40 |
| 2023/0007381 A1* | 1/2023 | Liu | H02J 7/00034 |
| 2023/0198801 A1* | 6/2023 | Ngo | H04L 12/40084 710/110 |

OTHER PUBLICATIONS

Product AS3447, Power & Communication Interface. Retrieved from Internet <URL:https://ams.com/as3447>, (5 pgs).
Product AS3442, Power & Communication Interface. Retrieved from Internet <URL:https://ams.com/as3442>, (5 pgs).
Chinese office action mailed Sep. 27, 2023 in related Chinese patent application No. 202110040702.2, (18 pgs).
Response to Chinese office action filed Feb. 5, 2024 in related Chinese patent application No. 202110040702.2, (7 pgs).

* cited by examiner

SYSTEM AND METHOD FOR DUAL-PORT COMMUNICATION AND POWER DELIVERY

CROSS REFERENCE TO RELATED APPLICATION

The application claims the benefit under 35 U.S.C. § 119(e) of Provisional Application Ser. No. 62/960,580, entitled "SYSTEM AND METHOD FOR DUAL-PORT COMMUNICATION AND POWER DELIVERY", filed on Jan. 13, 2020, and listing Wuguang Liu and Stewart Merkel as the inventors. The aforementioned patent document is incorporated by reference herein in its entirety.

BACKGROUND

A. Technical Field

The present invention relates generally to communication and power delivery, and method for its implementation for one-wire applications.

B. Background of the Invention

In one-wire applications, a power management unit assists in maintaining the communication between a first electronic device and a second electronic device via a one-wire I/O interface. The one-wire I/O interface may serve as input port, output port and/or power supply port, such that the overall I/O interface may be simplified. Such a configuration is beneficial for various applications, especially for devices with small size and not requiring a high data rate.

Various efforts have been made to improve communication and power delivery methods for one-wire applications. Since the one-wire I/O interface is shared as a data communication channel and a power channel between two electronic devices, the interface needs to be managed to avoid any conflicts for interface usage, especially when both devices are masters. Also, a first electronic device and a second electronic device may communicate via a one-wire I/O interface in a multi-voltage system, which requires the I/O interface to be adaptive for operation.

Accordingly, it would be desirable to have a system of communication and power delivery between electronic devices, and method for its implementation for one-wire applications.

SUMMARY OF THE INVENTION

Embodiments of the invention relate to communication and power delivery for one-wire applications.

In one or more embodiments, the dual-port circuit is a slave bridge that provides two one-wire links for two one-wire masters to communicate with one another in a multi-voltage system. Each one-wire link shares a buffer to transfer data. Additionally, the dual-port circuit may support a bidirectional pass through mode that allows level shifted fast logic signals, e.g. up-to 512 kbps, to pass through the two one-wire links. A dedicated timer may be configurable to time-out the pass through mode from edge in-activity. This may be configured for simplex (one direction only) or half duplex (devices take turns transmitting and receiving) UART to UART communication when passing large amounts of data. A status byte may be used to know when the buffers are filled and the idle logic state of the two one-wire links. The operation may derive the power directly from a one-wire IOA link, eliminating the need for an external power supply when local power is not available. When local power is available, one-wire IOB link provides local access and the pass through mode. In one or more embodiments, the one-wire IOA link is 5V tolerant to allow charger power across a one-wire bus. This may be accomplished with a comparator to detect when voltage on the one-wire IOA link is greater than a predetermined voltage, e.g. 4V. The predetermined voltage is typically larger than operation voltage (e.g. 3.3V) on the one-wire link IOA for data communication.

In one or more embodiments, a one-wire bus system comprising a dual-port circuit as a slave bridge device is disclosed. Hardware configuration, transaction sequence, and one-wire signaling (signal types and timing) of the one-wire bus system are respectively described. One or more one-wire protocol defines bus transactions in terms of the bus state during specific time slots that are initiated on the falling edge of sync pulses from the bus master. In one or more embodiments, a one-wire bus has only a single line; therefore each device on the bus needs to drive the bus at the appropriate time. To facilitate this, each device attached to the one-wire bus may have open-drain or three-state outputs. In one or more embodiments, the idle state for the one-wire bus is set as high. If a transaction needs to be suspended, it is desirable that the bus to be left in the idle state for the transaction to resume. If this does not occur and the bus is left low for more than a predetermined time, one or more devices on the bus will be reset.

In one or more embodiments, the protocols for accessing the dual-port circuit through either IOA or IOB one-wire port are disclosed. The protocols may comprise initialization, ROM function command, device function command, and transaction/data.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

Figure 1:
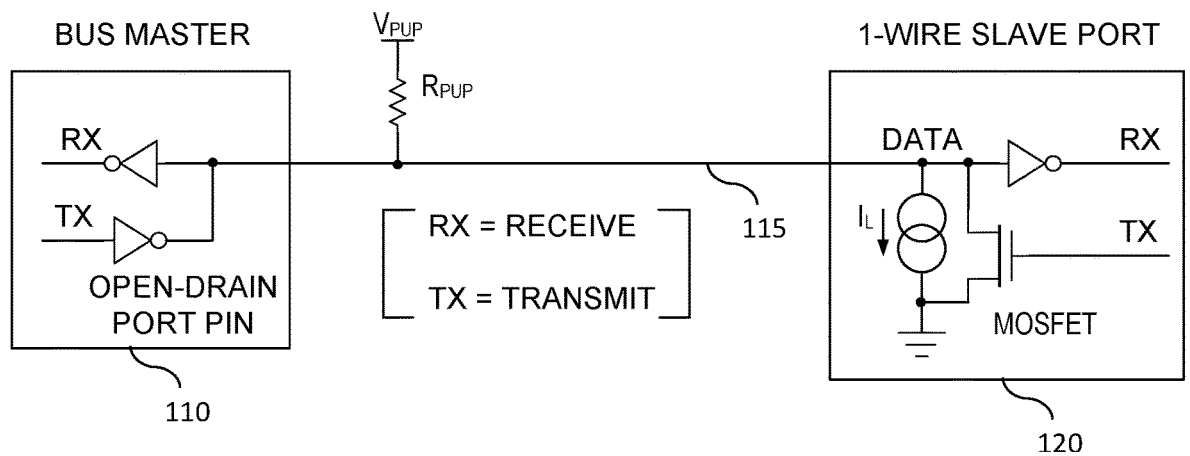
FIG. 1 depicts a block diagram of a first electronic device in communication with a second electronic device via a one-wire I/O bus.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

FIG. 1 is a block diagram of a first electronic device 110 in communication with a second electronic device 120 via a one-wire I/O bus 115. In one or more embodiments, the first electronic device 110 functions as a master device, while the second electronic device 120 functions as a slave device. The one-wire bus 115 may only have a single line. Therefore, it is important that each device on the bus drives it at an appropriate time. In one or more embodiments, to facilitate this, each device attached to the one-wire bus has open-drain or three-state outputs. In one or more embodiments, the idle state for the one-wire bus is set as high. If for any reason a transaction needs to be suspended, the bus needs to be left in the idle state if the transaction is to resume. If this does not occur and the bus is left low for more than a certain time, e.g. 15.5 µs (overdrive speed), one or more devices on the bus could be reset. Despite the "one-wire" name, all devices may also have a second wire, a ground connection, to permit a return current to flow through the data wire. Communication occurs when a master device or a slave device briefly pulls the bus low from $V_{PUP}$, i.e., connects the pull-up resistor ($R_{PUP}$) to ground through its output MOSFET.

Figure 2:
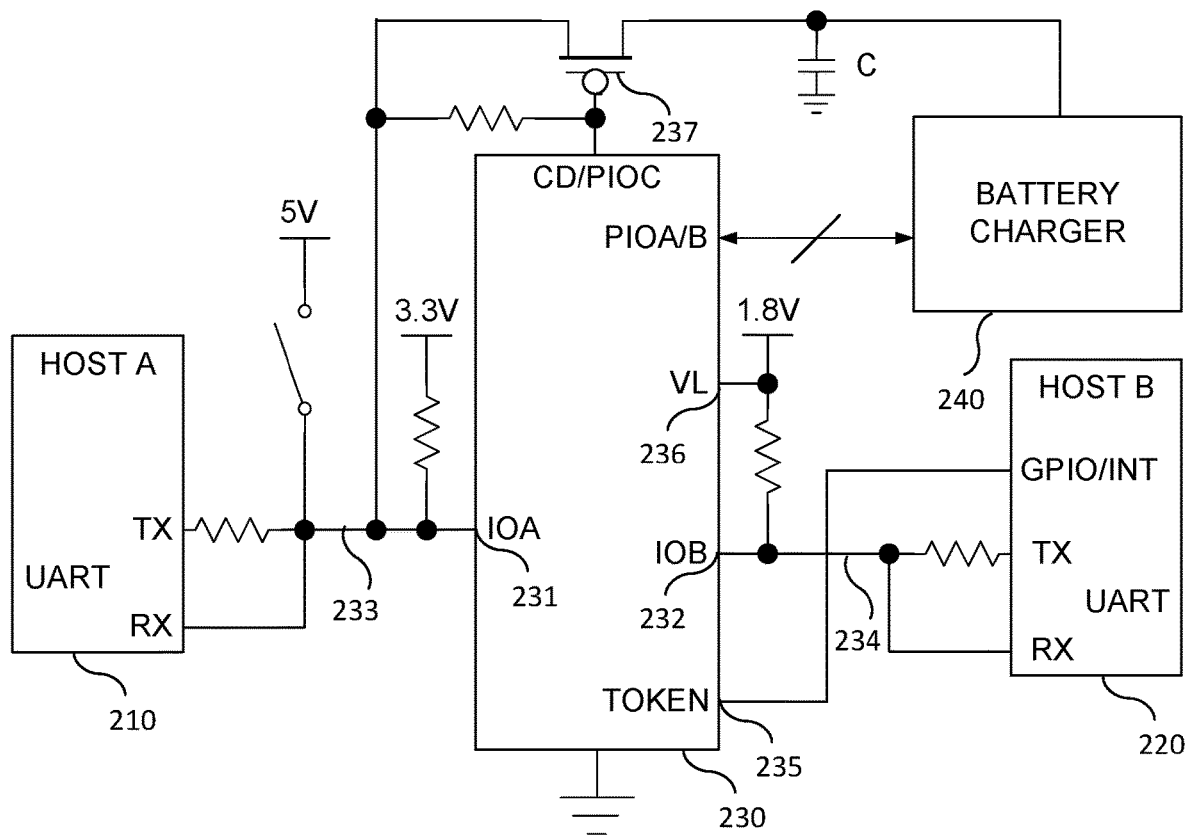
FIG. 2 depicts an exemplary block diagram of a dual-port circuit coupled between two one-wire host circuits according to various embodiments of the invention.

In certain situations, one-wire communications may be implemented between a master and a slave, wherein the master initiates activity on the bus, simplifying the avoidance of collisions on the bus. Protocols may be built into the master's software to detect collisions. After a collision, the master may retry communication. When two one-wire masters desires to communicate with each other, a one-wire slave bridge device or circuit may be needed for establishing the link between the two one-wire masters. FIG. 2 depicts an exemplary block diagram of a dual-port circuit 230 coupled between two one-wire host devices or circuits 210 and 220 according to various embodiments of the invention. In one or more embodiments, the dual-port circuit 230 is a slave bridge device comprising a first one-wire input/output port (IOA hereinafter) 231 and a second one-wire input/output port (IOB hereinafter) 232 in communication with the host circuits 210 and 220 via IOA link 233 and IOB link 234 respectively. The dual-port circuit 230 may further comprises additional general-purpose input/output ports (PIOA, PIOB, or PIOC, as shown in FIG. 2). The IOA port may be used to derive $V_{DD}$ power during idle high times for IOA link 233 and storing energy in an internal parasite capacitor. In one or more embodiments, the IOA link 233 and the IOB link 234 may incorporate a diode, instead of a resistor, for each link with the anode side coupled to the dual-port circuit 230.

In one or more embodiments, in order to coordinate communication between the two one-wire input/output ports, the dual-port circuit 230 further comprises a token pin 235 configured to indicate which one-wire input/output port gets the communication token. When the token pin is set to a first logic level (e.g. a logic low), the IOA link is set for one-wire communication; while When the token pin is set to a second logic level (e.g. a logic high) opposite to the first logic level, the IOB link is set for one-wire communication. In one or more embodiments, the token pin 235 may output a low frequency clock ($TOK_F$) while the dual-port circuit 230 operates in a pass through mode, which allows level shifted fast logic signals (e.g. up-to 512 kbps) to pass through the two one-wire links. A dedicated timer may also be configurable to time-out the pass through mode from edge in-activity. This may be useful for simplex (one direction only) or half duplex (devices take turns transmitting and receiving) UART to UART communication when passing large amounts of data.

In one or more embodiments, the dual-port circuit 230 may further comprise a power receiving port 236, which may couple to receive a voltage $V_L$ for powering internal digital circuit and IOA/IOB pin source requirements in the pass through mode. $V_L$ may range from 1.71V to 5.25V.

In one or more embodiments, the dual-port circuit 230 may further comprise a charger disable (CD) port, which may also function as a general-purpose input/output port (e.g. sharing the CD port is sharing with the PIOC port as shown in FIG. 2). The CD port may be floating (i.e. non-conducting) when the IOA port 231 is nominally below a threshold voltage (e.g. 4V). Otherwise the CD port is actively low to enable a charger 240 by switching on a controllable switch 237 (e.g. a P-type transistor, a N-type transistor, a N-channel transistor, a P-channel transistor, etc.) when IOA is above 4V. The PMOS transistors depicted in the drawings are for illustrating purpose in describing the present application and are not limiting the choice of the switch. One in the art shall understand that the other types of switches (e.g., N-type, N-channel, P-type, P-channel, BJT switches) may also be applicable for one or more embodiments in the present invention.

Figure 3:
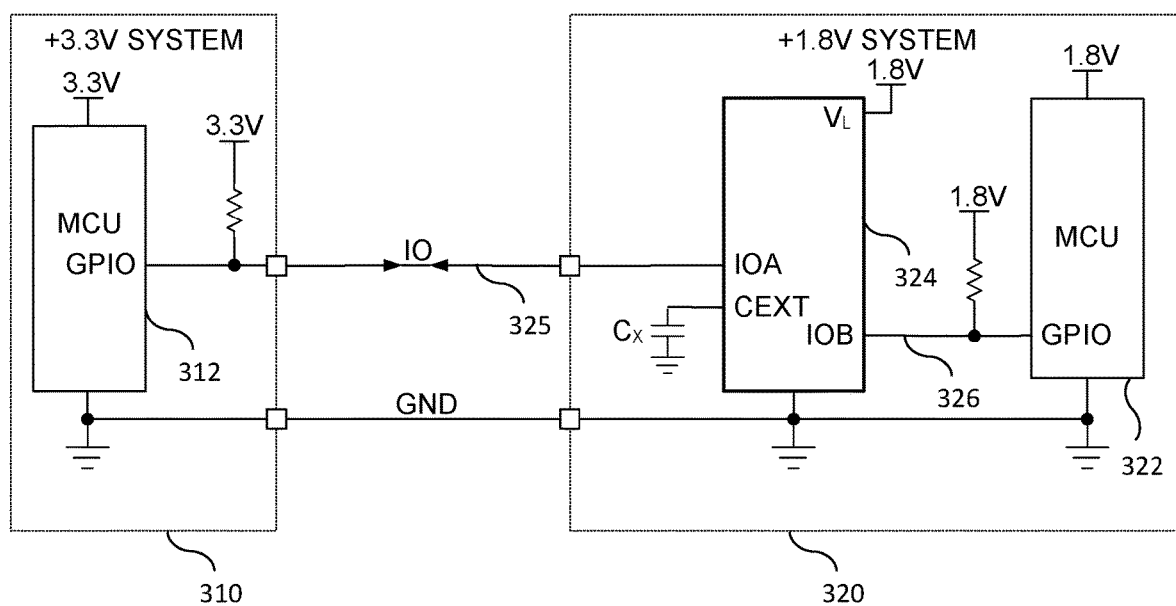
FIG. 3 depicts an exemplary block diagram of a dual-port circuit coupled in a multi-voltage system according to various embodiments of the invention.

In one or more embodiments, the dual-port bridge circuit may be applied in a multi-voltage system for one-wire communication. FIG. 3 depicts an exemplary block diagram of a dual-port circuit coupled in a multi-voltage system comprising a first device 310 and a second device 320 according to various embodiments of the invention. The first device 310 comprises a first microcontroller (MCU) 312 operated at 3.3V, while the second device 320 comprises a second microcontroller (MCU) 322 operated at 1.8V. A dual-port circuit 324, integrated within the second device 320, couples between the first MCU and the second MCU. The dual-port circuit 324 comprises a first one-wire port IOA in communication with the first MCU 312 via a first one-wire bus 325 and a second one-wire port IOB in communication with the second MCU 322 via a second one-wire bus 326. Through the dual-port circuit 324, the first device 310 (or the first MCU 312) and the second device 320 (or the second MCU 322) may have one-wire communication, even though they are operated in different voltages.

Figure 4:
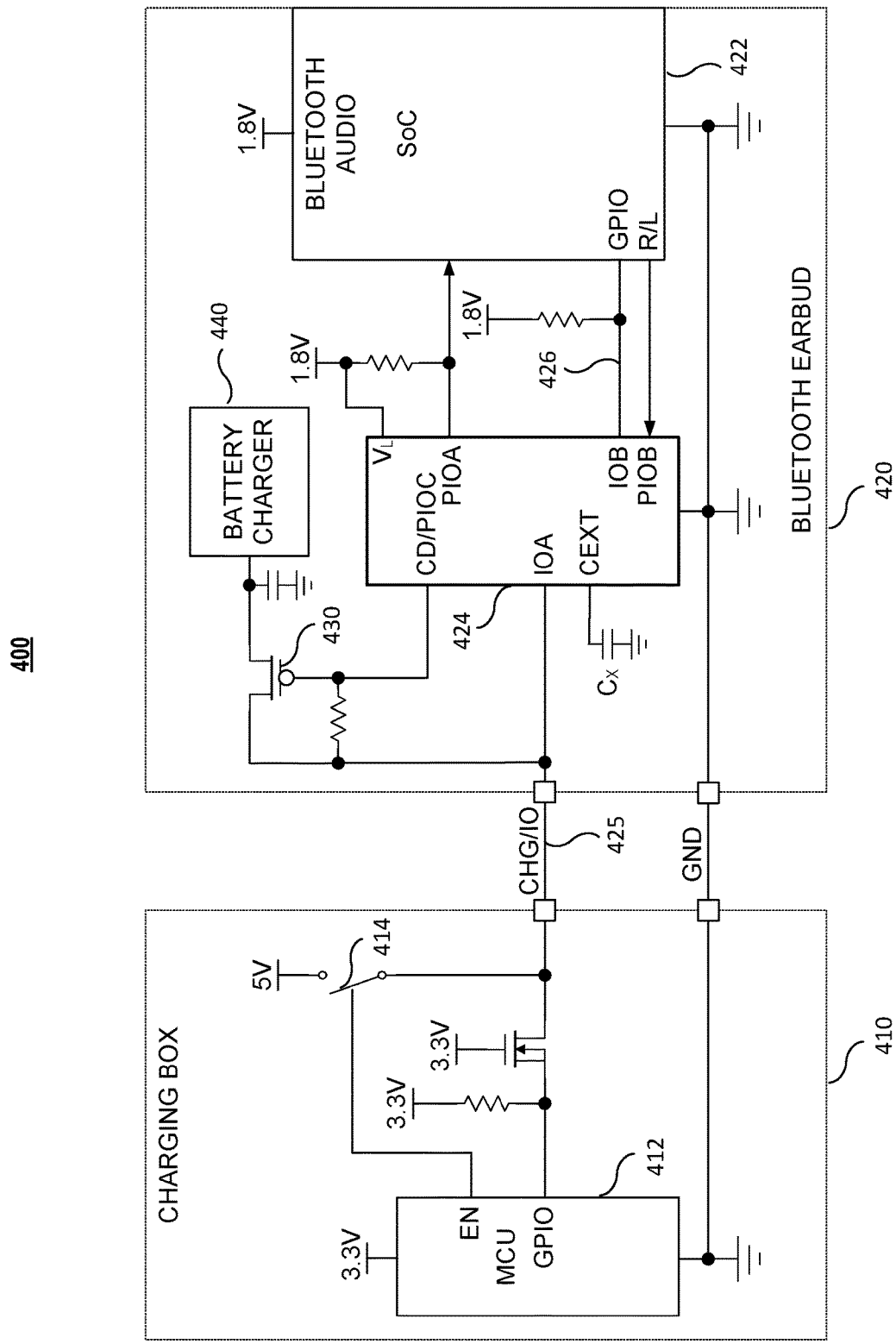
FIG. 4 depicts a simplified block diagram of a dual-port circuit in an application of a Bluetooth earbud in communication with a charge box according to various embodiments of the invention.

FIG. 4 is an exemplary block diagram 400 of a dual-port circuit in an application of a Bluetooth earbud 420 in communication with a charge box 410 according to various embodiments of the invention. The charge box 410 incorporates a first microcontroller (MCU) 412 for charging and I/O control. The Bluetooth earbud 420 comprises a circuit (e.g. a Bluetooth audio chip) 422 and a dual-port circuit 424.

The dual-port circuit 424 comprises a first one-wire port IOA in communication with the first MCU 412 via a first one-wire bus 425 and a second one-wire port IOB in communication with the circuit 422 via a second one-wire bus 426. The first one-wire bus 425 may function as either a communication channel for data exchange or a charging path. The first MCU 412 has an enable port (EN) coupled to control a controllable switch 414, which switchably couples the first one-wire bus 425 to a 5V voltage source for charging the Bluetooth earbud 420. Once the voltage of the first one-wire bus 425 is raised to 5V, a charger disable (CD) port in the dual-port circuit 424 is pulled low to switch on a controllable switch 430 (e.g. a PMOS switch), thus engaging the 5V voltage source to a battery charger 440 for battery charge activation. When the first one-wire bus 425 functions for a communication channel for data exchange, the first one-wire bus 425 decouples from the 5V voltage source by switching off the controllable switch 414 and operatively couples to a 3.3V voltage source for data communication between a GPIO port of the first MCU 412 and an one-wire I/O port (IOA) of the dual-port circuit 424.

Similar to the dual-port circuit 230 shown in FIG. 2, the dual-port circuit 424 also has a second one-wire input/output port (JOB) in communication with the Bluetooth audio chip 422 via IOB link 426, which is operatively coupled to a 1.8V voltage source. The dual-port circuit 424 may further comprises additional general-purpose input/output ports (PIOA, PIOB, or PIOC) and a token pin (not shown in FIG. 4) configured to indicate which one-wire input/output port gets the communication enabled.

Figure 5:
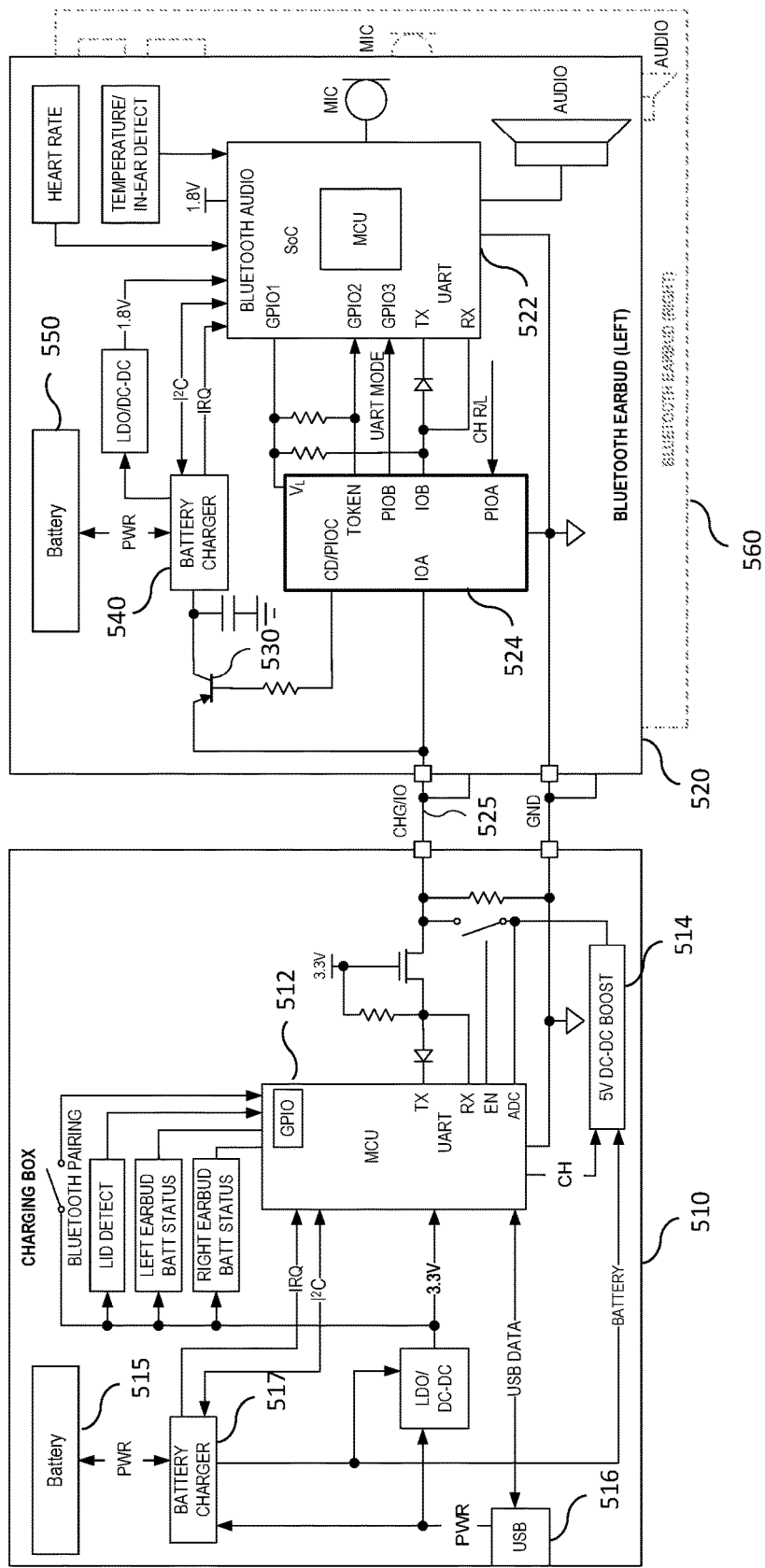
FIG. 5 depicts a detailed block diagram of a dual-port circuit in an application of true wireless stereo (TWS) earbuds in communication with a charge box according to various embodiments of the invention.

FIG. 5 depicts a detailed block diagram 500 of a dual-port circuit in an application of true wireless stereo (TWS) earbud 520 in communication with a charge box 510, according to various embodiments of the invention. It shall be noted that some of the blocks depicted (i.e., heart rate, temperature, etc.) may be optional and the drawing may not be limited to the elements depicted. The communication may support a universal asynchronous receiver/transmitter (UART) pass through mode between the earbud 520 and the charge box 510. The charge box 510 may comprise a charging battery 515 to provide charging power to the earbud 520. The charge box 510 may be powered by an external power source via an USB interface 516, which may also couple to the charging battery 515 via an internal battery charger 517 for charging the charging battery 515. The basic layout of the block diagram 500 may be similar to the block diagram 400 shown in FIG. 4. Additionally, in FIG. 4, the 5V power supply used to power the one-wire charge/IO link 525 for charging purpose may be from a 5v DC-DC boost circuit 514. Alternatively, the power supply used to power the one-wire charge/IO link may be sourced from the charging battery 515 directly. The MCU 512 may further comprise additional GPIO pins for receiving additional information, e.g. charge box lid detection, left earbud battery status, right earbud battery status, etc. In one or more embodiments, the charge box 510 shown in FIG. 5 has single one-wire interface (single wire interface) for communication with the earbud 520 and earbud 560, as shown in FIG. 5. In one or more embodiments, the earbud 520 and earbud 560 may receive the charging voltage alternatively or simultaneously. One skilled in the art shall understand the charge box 510 may be modified to have additional one-wire interface(s) so support communication with multiple earbuds (e.g. left earbud and right earbud). For example, the charge box 510 may charge multiple earbuds simultaneously or alternatively, may have one-wire data communications with multiple earbuds simultaneously or alternatively. Such modification shall still be within the scope of the invention.

In one or more embodiments, the dual-port circuit 524 has a first one-wire input/output port (IOA) in communication with the charge box 510 via the one-wire charge/IO (single wire) link 525. Once the dual-port circuit 524 senses the voltage on the one-wire charge 40 link 525 higher than a predetermined threshold (e.g. >4V), a charger disable (CD) port in the dual-port circuit 524 is pulled low to switch on a controllable switch 530, thus engaging the 5V voltage source to a battery charger 540 for charging the battery 550, which may be a lithium-ion battery. In one or more embodiments, the Bluetooth audio chip 522 may communicate with the battery charger 540 via I2C interface to exchange information such as charging current, battery status, etc. The audio chip 522 may also receive interrupt request (or IRQ) from the battery charger 540 if one or more parameters are beyond determined thresholds. For example, the internal battery 515 in charge box 510 may have a battery capacity (e.g., in 1000-2000 mA-h) may be greater than a battery capacity (e.g., in 60-150 mA-h) of a battery (e.g., battery 550) in the left earbud, the right earbud, or both.

The dual-port circuit 524 also has a second one-wire input/output port (JOB) in communication with the Bluetooth audio chip 522 via IOB link. The dual-port circuit 524 may further comprises additional general-purpose input/output ports (PIOA, PIOB, or PIOC) and may use one of the GPIO pin (e.g. the PIOA pin as shown in FIG. 5) for UART commination with the Bluetooth audio chip 522 via a GPIO pin (e.g. GPIO3) in the chip 522.

Figure 6A:
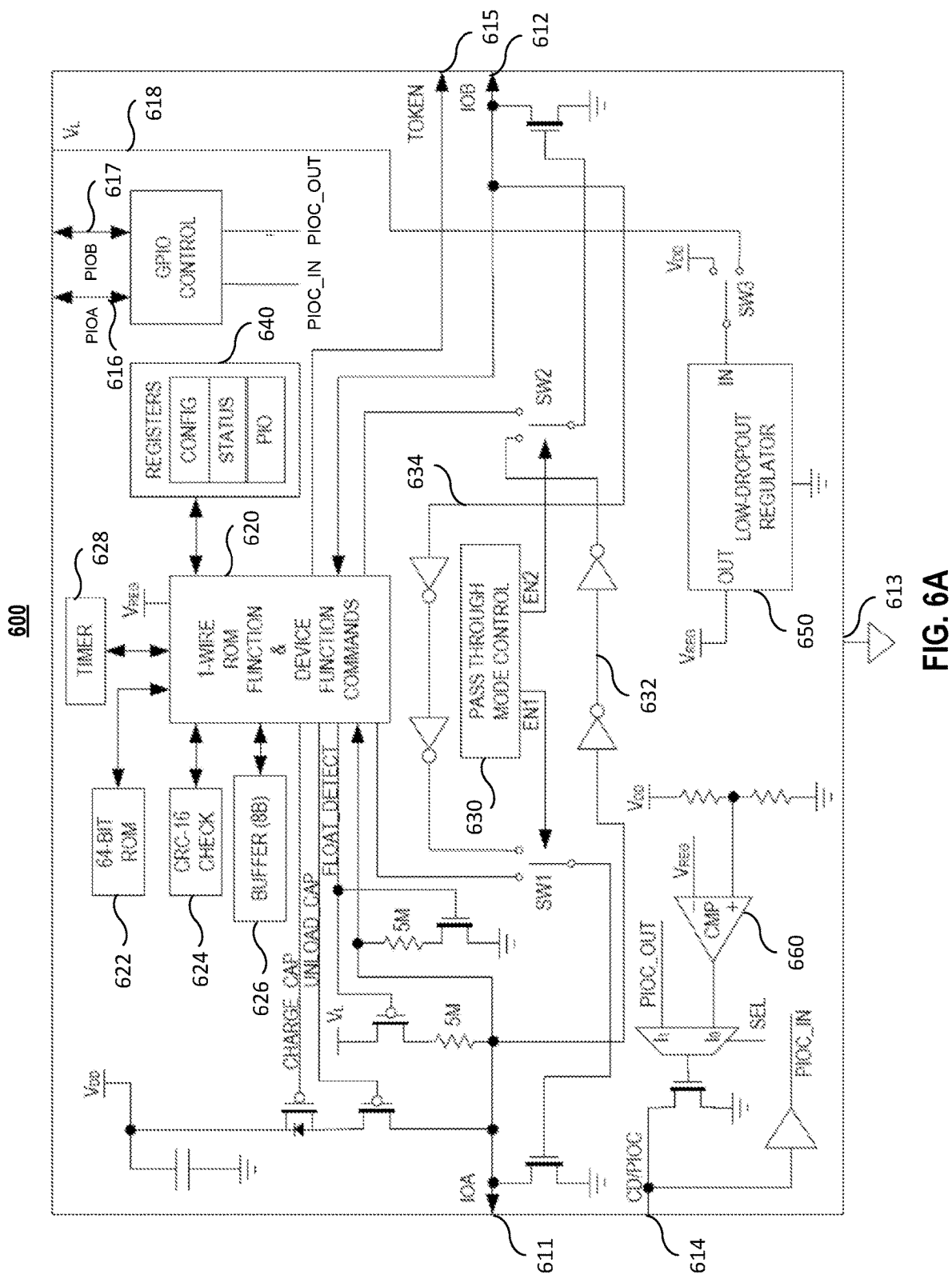
FIG. 6A depicts an exemplary schematic diagram of a dual-port circuit for one-wire applications according to various embodiments of the invention.

FIG. 6A is an exemplary schematic diagram of a dual-port circuit 600 for one-wire applications according to various embodiments of the invention. The dual-port circuit 600 has eight ports or pins: a first one-wire I/O pin (IOA) 611 for a first one-wire (single wire) link, a second one-wire I/O pin (JOB) 612 for a second one-wire (single-wire) link, a ground pin 613, a charge default (CD) pin 614 (which may also function as a GPIO pin: PIOC), a token pin 615, a first GPIO pin (PIOA) 616, a second GPIO pin (PIOB) 617, and a $V_L$ pin 618 for receiving a low power voltage $V_L$.

Internally, the dual-port circuit 600 may further comprise a collection of function commands 620 (which may include one-wire ROM function commands and device function commands), a pass through model controller 630, a register 640, a voltage regulator 650, and a voltage comparator 660. In one or more embodiments, each one-wire link shares an 8-byte ROMID 622, a global configuration byte, and a data buffer 626 (e.g. an 8-byte buffer) to transfer data, all of which may be accessible by the function commands 620. Additionally, each one-wire link may further share one status byte, three configurable open-drain GPIO pins. The status byte, POI information, and the configuration byte may be stored in the register accessible by the function commands 620. The voltage regulator 650 may switchably couple to the low power voltage $V_L$ or the voltage $V_{DD}$ on the IOA link, and output a regulated voltage $V_{REG}$, which is used for powering internal circuitry and for voltage comparison.

In one or more embodiments, the dual-port circuit 600 provides an interface to allow: switching in charger power across a one-wire bus, dual one-wire master communication, GPIO expansion and timer limited logic level translation. An integrated comparator 660 may be used to compare the voltage on the IOA link ($V_{DD}$) to a predetermined voltage ($V_{REG}$), and accordingly to switch in charger power or one-wire IOA access. In one or more embodiments, a voltage divider is applied to lower the $V_{DD}$ for a desired voltage level suitable as input to the comparator 660. The dual-port circuit 600 may operate the IOA link with internal parasitic supply when needed while JOB one-wire link may be operated by a low power supply source ($V_L$). The parasite supply provides access to all registers, ROMID and status information regardless if $V_L$ is present. A data buffer 626 is used to exchange data between the two IOA and JOB one-wire links. Three general purpose I/O pins (PIOA/B/C) may provide GPIO expansion for additional functionalities. Level translation direction may be selected by either one-wire link and allow a passing of serial logic data between IOA and IOB at higher rates, e.g. up-to 512 kbps.

Figure 6B:
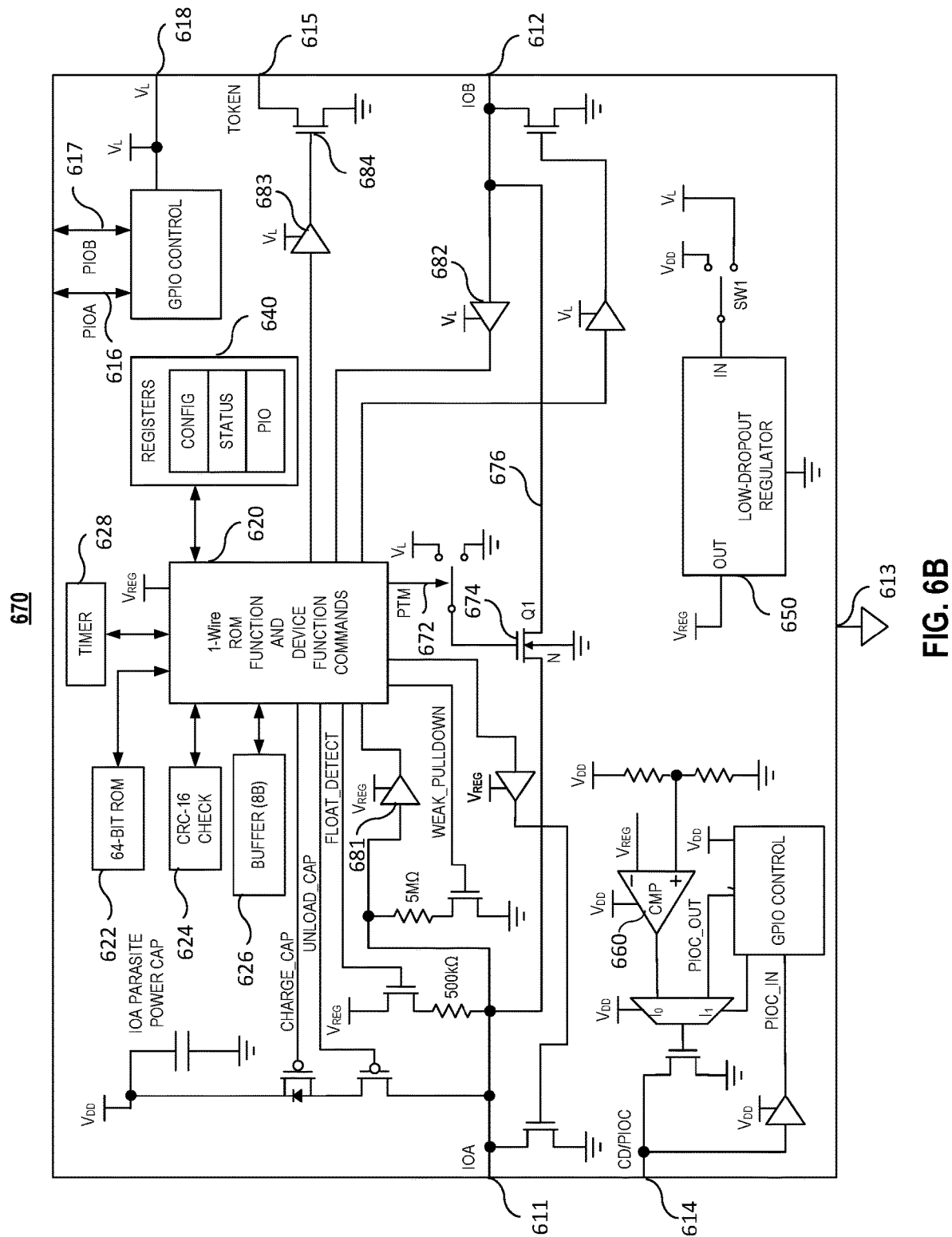
FIG. 6B depicts an alternative schematic diagram of a dual-port circuit for one-wire applications according to various embodiments of the invention.

FIG. 6B depicts an alternative schematic diagram of a dual-port circuit for one-wire applications according to various embodiments of the invention. Except a few differences, the dual-port circuit 670 is similar to the dual-port circuit 600 shown in FIG. 6A. One difference is that in the dual-port circuit 670, the function commands 620 outputs a PTM signal 672. When the PTM signal 672 is a high level, a pass-through device (e.g., an nMOS switch 674) is turned ON to allow bidirectional UART communication between IOA and IOB via a link 676. IOA high-side to JOB low-side level translation may be achieved by limiting the gate of the nMOS 674 to the low-side $V_L$ supply. In one or more embodiments, the IOA pullup voltage, $V_{PUPA}$ may need to be greater than or equal to $V_L$ in pass-through mode. Furthermore, in the dual-port circuit 670, the IOA pin 611 and the IOB pin 612 may couple to the function commands 620 via a buffer 681 and a buffer 682 respectively, with the outputs of these two buffers coupled to the function commands 620. Furthermore, in the dual-port circuit 670, the token pin 615 couples to the function commands 620 via a token pin buffer 683 and a token pin nMOS 684, with input of the token pin buffer 683 connected to the function commands 620.

Token Operation

In one or more embodiments, the dual-port circuit detects voltage on the IOA/IOB links and automatically switches the communication token between the links. The selection of IOA or IOB link is controlled by the token pin 615. This pin indicates which one-wire side gets the communication token. In one or more embodiments, a logic low at the token pin stands for IOA side while logic high stands for IOB side. In one or more embodiments, the token pin 615 outputs a low frequency clock ($TOK_F$) while in a pass through mode. Additionally, an impedance check may be done by software when appropriate.

In one or more embodiments, each one-wire link shares an 8-byte buffer to transfer data. As well, the two one-wire links share an 8-byte ROMID, a global configuration byte, one status byte and three configurable open-drain GPIO pins. Each ROMID is a unique 64-bit registration number that is factory programmed into the device. The configuration byte can be used to set a bidirectional pass through mode that allows level shifted fast logic signals up-to 512 kbps to pass through the two one-wire links. The status byte may be used to know when the buffers are filled and the idle logic state of the two one-wire links. Power is derived for operation directly from a one-wire IOA link, eliminating the need for an external power supply when local power is not available. When local power is available, one-wire IOB link provides local access and the pass through mode.

Figure 7:
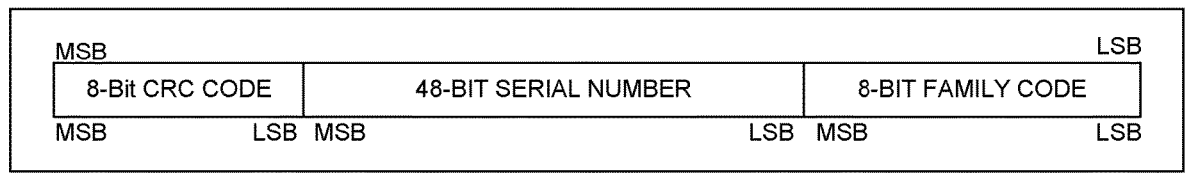
FIG. 7 depicts an exemplary bit diagram of a ROM ID for a dual-port circuit according to various embodiments of the invention.

In one or more embodiments, the dual-port circuit 600 contains a unique ROM ID that is 64 bits long. The ROM ID may provide trace-ability for the dual-port circuit. The first 8 bits are a one-wire family code. The next 48 bits are a unique serial number. The last 8 bits are a cyclic redundancy check (CRC) of the first 56 bits, as shown in FIG. 7. In one or more embodiments, the one-wire CRC is generated using a polynomial generator consisting of a shift register and XOR gates. The polynomial may be expressed as $X^8+X^5+X^4+1$.

There are pluralities of device function commands that may be summarized in Table 1. Within a device function command flow diagram (shown in FIG. 13), the data transfer is verified when writing and reading by a cyclic redundancy check (CRC) of multi-bit type (e.g. CRC-16) 624.

TABLE 1

Device Function Command Summary

| Command | Description | Type |
|---|---|---|
| Write Configuration | General Configuration | Global |
| Read Configuration | General Configuration | Global |
| Write Buffer | Write Buffer | Memory |
| Read Buffer | Read Buffer | Memory |
| Read Status | Read Status | General |
| PIO Write | PIO Write conducting or float | Access |
| PIO Read | PIO Read logic state | Access |
| Write Start Value | Write to the Start Value register | General |
| Read Start Value | Read the Start Value register | General |

In one or more embodiments, the write configuration command is used to set the configuration register. The write configuration sets the global configuration for the device. The SEL bit may be useful in pin mode selection between CD and PIOC. Default is comparator functionality for detecting when charging supply is detected on the IOA pin or when IOA is a one-wire link. Additionally, a pass through mode (PTM bit) with level shifting may be available when simplex or half duplex UART communication is desired between IOA and IOB pins. The level shifter may have communication up-to 512 kbps until a timer to expire pass through mode when IOA/IOB pins are not active. If activity on IOA/IOB bus is detects, the timer is reset again to the value set in the start value register (SVAL bits) to maintain the connection. When in normal one-wire operation, some applications may need interrupt support for when Buffer have been written. This is accomplished by providing PIOA/B with the BUFA/B flags output with inverted logic. Therefore, if the BUFA/B flags are set to '1' then PIOA/B pins will be conducting. If the BUFA/B flags are not set, then the PIOA/B pins will be non-conducting. In one or more embodiments, some restrictions, e.g. the requiring of $V_L$ supply to be present in pass through mode, may be applied to the write configuration command.

TABLE 2

Write Configuration Parameter Byte

| BIT 7 | BIT 6 | BIT 5 | BIT 4 | BIT 3 | BIT 2 | BIT 1 | BIT 0 |
|---|---|---|---|---|---|---|---|
| X | X | PULLUP | QM | PTM | BUFBPE | BUFAPE | SEL |

Table 2 shows parameter bits for the write configuration command and Table 3 shows a sequence for write configuration. Details of some parameter bits are descripted below.

Bit 0: Select (SEL). When set to 1, PIOC pin function is operational. When set to 0 (default), CD pin function is operational.

Bit 1: BUFA Port Enable (BUFAPE). When set to 1, the PIOA pin will output the invert logic of the BUFA flag in the status register. When set to 0 (Default), the PIOA pin will be normal access.

Bit 2: BUFB Port Enable (BUFBPE). When set to 1, the PIOB pin will output the invert logic of the BUFB flag in the status register. When set to 0 (Default), the PIOB pin will be normal access.

Bit 3: Pass Through Mode (PTM). When set to 1, PTM is enabled and the timer begins to monitor IOA/IOB pins for activity (i.e. falling edge transitions) and outputs a clock on the TOKEN pin. The timer will reset for any falling edge activity to the start value as to maintain PTM. If no activity occurs then the PTM will automatically return to normal one-wire operation states and the PTM bit will return to 0 when the timer expires. When set to 0 (Default), pass through mode is disabled and the timer is used to monitor IOA pin for transitioning into and maintaining the IOA pin "logic low" state. A falling edge on IOA sets the timer to its start time value. If the timer expires and confirms that a logic low is still present, then IOB link is passed the token (i.e. no other falling edge transition occurred). While IOB link has the token, the timer will continue to repeat and test that the IOA link state of 'logic low' is maintained. However, if another falling edge transition occurs before the timer expires then the 'logic state' will exit to the appropriate state (e.g. IOA link state "Idle logic high") when the timer expires. See TWS Truth Table for more details on the states.

Bit 4: Quiet Mode (QM). When set to 1, QM is enabled and the timer begins to monitor IOA pin for activity (i.e. falling edge transitions) and outputs logic high on the TOKEN pin. The timer will reset for any IOA pin falling edge activity to the start value as to maintain QM. If no other falling edge IOA activity occurs then the QM will automatically return to normal one-wire operation states and the QM bit will return to 0 when the timer expires.

Bit 5: Pullup (PULLUP). In one or more embodiments, when set to 1, a 5M pullup resistor from the IOA link to $V_L$ is connected. When set to 0 (Default), the pullup resistor is disconnected from $V_L$ and the same resistor becomes a pulldown to ground. In this way, IOA pin will not be floating when not connected to any equipment and one-wire IOB link will have access.

TABLE 3

Write Configuration Sequence

Reset
Presence Pulse
<ROM Select>
TX: Command 11h (Write Configuration)
TX: Parameter (Write Configuration)
RX: CRC16 (inverted of command, parameter)
Reset In one or more embodiments, the read configuration command is used to read the configuration register to confirm settings. Table 4 and Table 5 respectively show parameter bits and a sequence for the read configuration command.

TABLE 4

Read Configuration Parameter Byte

| BIT 7 | BIT 6 | BIT 5 | BIT 4 | BIT 3 | BIT 2 | BIT 1 | BIT 0 |
|---|---|---|---|---|---|---|---|
| X | X | PULLUP | QM | PTM | BUFBPE | BUFAPE | SEL |

TABLE 5

Read Configuration Sequence

Reset
Presence Pulse
<ROM Select>
TX: Command 22h (Read Buffer)
RX: Read Configuration
RX: CRC16 (inverted, command, and data)
Reset Details of parameter bits of the read configuration command are descripted below.

Bit 0: Select (SEL). Read bit state.

Bit 1: BUFA Port Enable (BUFAPE). Read bit state. Bit 2: BUFB Port Enable (BUFBPE). Read bit state.

Bit 3: Pass Through Mode (PTM). Read bit state.

Bit 4: Quiet Mode (QM). Read bit state.

Bit 5: Pullup (PULLUP). Read if pullup resistor is connected (1) or disconnected (0).

In one or more embodiments, the write buffer command is used to write a temporary value to the volatile buffer 626, which is used to transfer bytes to/from the one-wire IOA or IOB link. In one or more embodiments, if byte length (BLEN)>8d, buffer length is set to 8d. A BLEN of zero may imply no data to be loaded. IOA or IOB link can only write to the buffer if they have the token. During operation, flags are set for BUFA or BUFB in the Read Status register.

TABLE 6

Write Buffer Parameter Byte

| BIT 7 | BIT 6 | BIT 5 | BIT 4 | BIT 3 | BIT 2 | BIT 1 | BIT 0 |
|---|---|---|---|---|---|---|---|
| 0 | 0 | 0 | 0 | BLEN | | | |

Table 6 shows parameter bits for the write buffer command and Table 7 shows a sequence for write buffer. In one or more embodiments, BLEN is range from 1 to maximum length number of 8.

TABLE 7

Write Buffer Sequence

Reset
Presence Pulse
<ROM Select>
TX: Command 33h (Write Buffer)
TX: Parameter (BLEN)
TX: Data (1 to 8 bytes are written)
RX: CRC16 (inverted of command, parameter, data)
Reset In one or more embodiments, the read buffer command is used to read buffer from the one-wire IOA or IOB link. In one or more embodiments, if byte length (BLEN)>8d, the value read will be 8d. A BLEN of zero may return to no data. In one or more embodiments, the read buffer length byte is similar to the write buffer parameter byte shown in Table 6, with BLEN indicating the number of bytes to be read.

Table 8 shows a sequence for write buffer. In one or more embodiments, BLEN is range from 1 to maximum length number of 8.

TABLE 8

Read Buffer Sequence

Reset
Presence Pulse
<ROM Select>
TX: Command 44h (Read Buffer)
RX: Byte Length (BLEN)
RX: Data (1 to 8d bytes)
RX: CRC16 (inverted, command, length byte, and data)
Reset The read status command reads if the buffer has been written too and the logical state of the one-wire IOA link and IOB link. This command is used for receiving status information. Provides a means to know if IOA link should read out buffer or if IOB link should read out buffer. Also used to check the logical state of the IOA/IOB links and if the comparator has detected charging voltage on IOA link. When the buffer is read, BUFB and BUFA flags are cleared. Table 9 and Table 10 respectively show status byte and a sequence for the read status command.

TABLE 9

Status Byte

| BIT 7 | BIT 6 | BIT 5 | BIT 4 | BIT 3 | BIT 2 | BIT 1 | BIT 0 |
|---|---|---|---|---|---|---|---|
| X | TRST | TOKS | CMPS | IOBS | IOAS | BUFB | BUFA |

Bit 0: Buffer A Flag (BUFA). Indicates the buffer was written from the IOA link.

Bit 1: Buffer B Flag (BUFB). Indicates the buffer was written from the IOB link.

Bit 2: IOA State (IOAS). Logic state of IOA pin.

Bit 3: IOB State (IOBS). Logic state of an AND gate with JOB and $V_L$ pins as the inputs.

Bit 4: Comparator State (CMPS). Output state of the comparator. This can be used to detect charging voltage when 1 and no charging voltage when 0 on the IOA pin.

Bit 5: Token State (TOKS). Logic state of the TOKEN pin. Toggles when in PTM.

Bit 6: Timer Reset (TRST). In 'logic low' state this indicates the timer has begun again with the start value.

TABLE 10

Read Status Sequence

Figure 8:
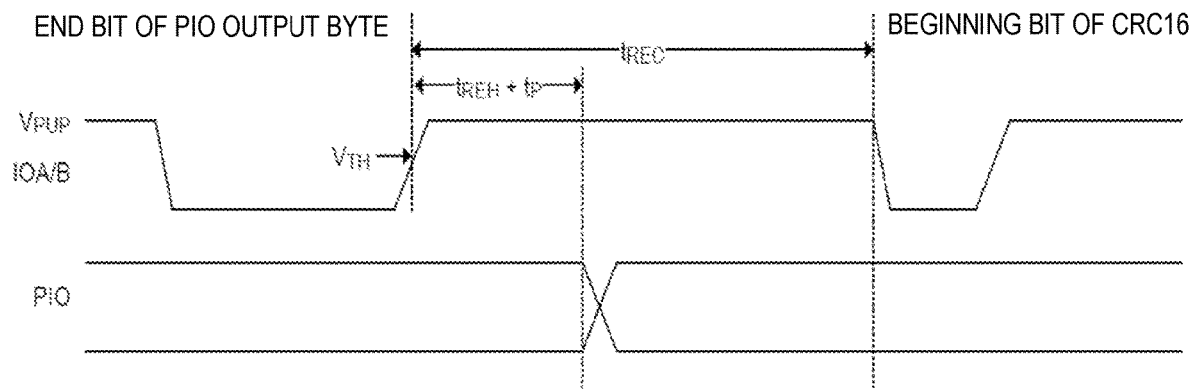
FIG. 8 depicts a diagram of PIO output timing according to various embodiments of the invention.

Reset
Presence Pulse
<ROM Select>
TX: Command 55h (Read Status)
RX: Status Byte
RX: CRC16 (inverted, command, status byte)
Reset In one or more embodiments, the PIO Write command sets the directed open-drain PIO pin to conducting or non-conducting high impedance state. To switch the output transistor on, the corresponding bit value is 0. To switch the output transistor off (non-conducting) the bit is set as 1. This way the bit transmitted as the new PIO output state arrives in its true form at the PIO pin. In one or more embodiments, the actual PIO transition to the new state may occur with a delay of $t_{REH}+t_p$ from the rising edge of the MS bit of the inverted PIO byte, as shown in FIG. 8.

In one or more embodiments, to protect the transmission against data errors, the master device or circuit sets an upper nibble to the one's compliment of the lower nibble in the PIO Output byte. When the transmission was error-free, the PIO status changes. During of the PIO write operation, the dual-port circuit sets PIO output state. If the CD pin is set in the configuration register then PIOCS bit will have no effect.

Table 11 and Table 12 respectively show PIO output byte and a PIO write sequence.

TABLE 11

PIO Output Byte

| BIT 7 | BIT 6 | BIT 5 | BIT 4 | BIT 3 | BIT 2 | BIT 1 | BIT 0 |
|---|---|---|---|---|---|---|---|
| 1 | PIOCS | PIOBS | PIOAS | 0 | PIOCS | PIOBS | PIOAS |

Bit 0: PIOA Output State (PIOAS). Set this bit to 0 for conducting (Logic low) or set this bit to 1 for non-conducting (High impedance or logic high with external pull-up).

Bit 1: PIOB Output State (PIOBS). Set this bit to 0 for conducting (Logic low) or set this bit to 1 for non-conducting (High impedance or logic high with external pull-up).

Bit 2: PIOC Output State (PIOCS). Set this bit to 0 for conducting (Logic low) or set this bit to 1 for non-conducting (High impedance or logic high with external pull-up).

TABLE 12

PIO Write Sequence

Reset
Presence Pulse
<ROM Select>
TX: Command 66h (PIO Write)
TX: Parameter (PIO Output byte)
RX: CRC16 (inverted of command, parameter)
Reset In one or more embodiments, the PIO read command reads the input logic state of the PIO pins. To protect the transmission against data errors, the masters expect the upper nibble to the one's compliment of the lower nibble in the PIO Input byte. If the CD pin is set in the configuration register, then PIOCL bit will represent this logic level.

Table 13 and Table 14 respectively show PIO input byte and a PIO read sequence.

TABLE 13

PIO Input Byte

| BIT 7 | BIT 6 | BIT 5 | BIT 4 | BIT 3 | BIT 2 | BIT 1 | BIT 0 |
|---|---|---|---|---|---|---|---|
| 1 | PIOCL | PIOBL | PIOAL | 0 | PIOCL | PIOBL | PIOAL |

Bit 0: PIOA Level (PIOAL). Provides the logic state of the PIOA pin.
Bit 1: PIOB Level (PIONL). Provides the logic state of the PIOB pin.
Bit 0: PIOC Level (PIOCL). Provides the logic state of the PIOC pin.

TABLE 14

PIO Read Sequence

Reset
Presence Pulse
<ROM Select>
TX: Command 77h (PIO Read)

TABLE 14-continued

PIO Read Sequence

RX: PIO input byte
RX: CRC16 (inverted of command, PIO input byte)
Reset

In one or more embodiments, the write start value command is used to set the start value of the timer to be decremented. The timer will use this value when first starting or when needing to repeat.

Table 15 and Table 16 respectively show the write configuration parameter byte and a write timeout value sequence.

TABLE 15

Write Configuration Parameter Byte

| BIT 7 | BIT 6 | BIT 5 | BIT 4 | BIT 3 | BIT 2 | BIT 1 | BIT 0 |
|---|---|---|---|---|---|---|---|
| | | | TVAL | | | | |

Bits 7:0: Timeout Value (TVAL). Sets the end time value for the timer. In one or more embodiments, the timer timeout value may be expressed as Time duration=TVAL×2 ms. For example, with 8-bits for TVAL, the maximum timer duration is set as 512 ms.

TABLE 16

Write timeout Value Sequence

Reset
Presence Pulse
<ROM Select>
TX: Command 88h (Write timeout Value)
TX: Parameter (TVAL)
RX: CRC16 (invert of command, parameter)
Reset In one or more embodiments, the read timeout value command is used to read the timeout value register to confirm settings. The read configuration parameter byte may be similar to the write configuration parameter byte shown in Table 15. Table 17 shows a read configuration parameter byte.

TABLE 17

Read Timeout Value Sequence

Reset
Presence Pulse
<ROM Select>
TX: Command 99h (Read Timeout Value)
RX: Read Timeout Value
RX: CRC16 (inverted, command, length byte, and data)
Reset Embodiments of Pass Through Operation In one or more embodiments, in a pass through mode (timer enabled), the dual-port circuit 600 may act as an open-drain bidirectional level translator. This may be accomplished by two invert gate paths 632 and 634 to provide bidirectional level translation between IOA and IOB links with the mode enabled in the configuration register, e.g. by setting the PTM bit as 1. The direction of the pass through operation may be controlled by a pass through controller 630 integrated within the dual-port circuit 600 to selectively engage one desired invert gate paths 632 or 634 via the switches SW1 or SW2. When the input is logic high, the corresponding open-drain N-FET is non-conducting. When the input is logic low the corresponding open-drain N-FET is conducting. In one or more embodiments, the dual-port circuit 600 requires external pullup resistors from IOA $V_{DD}$ and IOB $V_L$, allowing operation with open-drain output. In one or more embodiments, one or more internal circuitries may assist logic-state transitions for IOA link, by removing the internal parasitic capacitance in PTM.

Power-Supply Description

In one or more embodiments, the IOA pin 611 is used to derive the $V_{DD}$ power during idle high times for IOA link and storing energy in the internal parasite capacitor. In the pass through mode, $V_L$ is used to power the internal digital circuit and IOA/IOB pin source requirements. In one or more embodiments, $V_L$ may range from 1.71V to 5.25V.

In one or more embodiments, the dual-port circuit is a slave bridge that provides two one-wire links for two one-wire masters to communicate with one another in a multi-voltage system. Each one-wire link shares a buffer to transfer data. Additionally, the dual-port circuit may support a bidirectional pass through mode that allows level shifted fast logic signals, e.g. up-to 512 kbps, to pass through the two one-wire links. A dedicated timer may be configurable to time-out the pass through mode from edge in-activity. This may be configured for simplex (one direction only) or half duplex (devices take turns transmitting and receiving) UART to UART communication when passing large amounts of data. A status byte may be used to know when the buffers are filled and the idle logic state of the two one-wire links. The operation may derive the power directly from a one-wire IOA link, eliminating the need for an external power supply when local power is not available. When local power is available, one-wire IOB link provides local access and the pass through mode. In one or more embodiments, the one-wire IOA link is 5V tolerant to allow charger power across a one-wire bus. This may be accomplished with a comparator to detect when voltage on the one-wire IOA link is greater than a predetermined voltage, e.g. 4V. The predetermined voltage is typically larger than operation voltage (e.g. 3.3V) on the one-wire link IOA for data communication.

In one or more embodiments, a one-wire bus system comprising a dual-port circuit as a slave bridge device is disclosed. The system involves aspects of hardware configuration, transaction sequence, and one-wire signaling (signal types and timing). One or more one-wire protocol defines bus transactions in terms of the bus state during specific time slots that are initiated on the falling edge of sync pulses from the bus master. In one or more embodiments, a one-wire bus has only a single line; therefore each device on the bus needs to drive the bus at the appropriate time. To facilitate this, each device attached to the one-wire bus may have open-drain or three-state outputs. Both one-wire ports (IOA and JOB) of the dual-port circuit are open drain with an internal circuit equivalent to FIG. 1. In one or more embodiments, the idle state for the one-wire bus is set as high. If a transaction needs to be suspended, it is desirable that the bus to be left in the idle state for the transaction to resume. If this does not occur and the bus is left low for more than a predetermined time, e.g. 15.5 μs (overdrive speed), one or more devices on the bus will be reset.

In one or more embodiments, the protocol for accessing the dual-port circuit through either IOA or IOB one-wire port may comprise initialization, ROM function command, device function command, and transaction/data.

Initialization

In one or more embodiments, transactions on the one-wire bus begin with an initialization sequence. The initialization sequence may consist of a reset pulse transmitted by a bus master followed by presence pulse(s) transmitted by the slave(s). The presence pulse lets the bus master know that the dual-port circuit is on the bus and is ready to operate.

One-wire Signaling and Timing

To ensure data integrity, the dual-port circuit may require strict protocols, which may consist of four types of signaling on one line: reset sequence with reset pulse and presence pulse, write-zero, write-one, and read-data. In one or more embodiments, except for the presence pulse, the bus master initiates all falling edges. The dual-port circuit may communicate at overdrive speed when not is pass through mode.

In one or more embodiments, to get from idle to active, the voltage on the one-wire line needs to fall from $V_{PUP}$ below the threshold $V_{TL}$. To get from active to idle, the voltage needs to rise from $V_{ILMAX}$ past the threshold $V_{TH}$. The time it takes for the voltage to make this rise may be seen in FIG. 9 as c, and its duration depends on the pullup resistor ($R_{PUP}$) used and the capacitance of the one-wire network attached. The voltage $V_{ILMAX}$ is relevant for the dual-port circuit when determining a logical level, not triggering any events.

Figure 10:
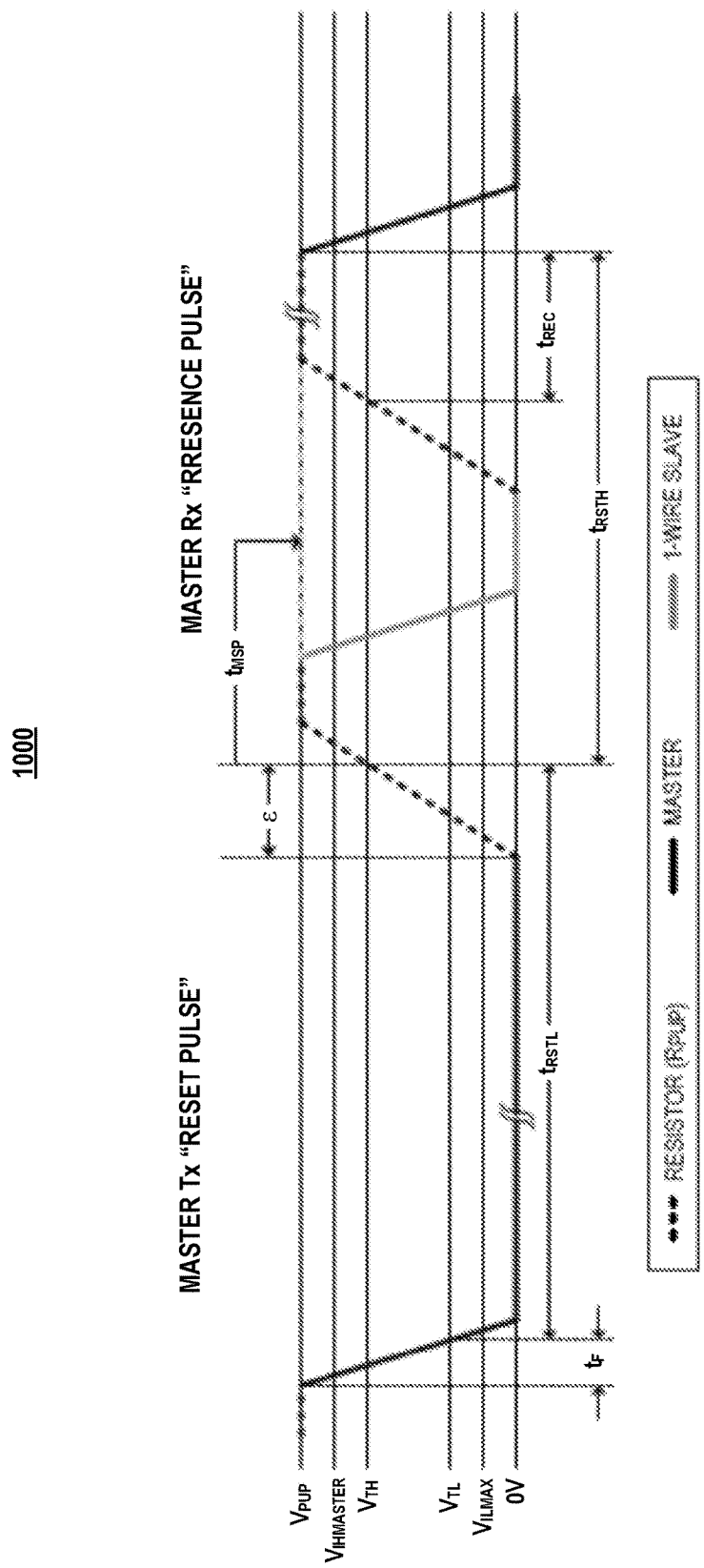
FIG. 10 depicts an initialization sequence required to begin communication with the dual-port circuit according to various embodiments of the invention.

FIG. 10 shows an initialization sequence to begin communication with the dual-port circuit. A reset pulse followed by a presence pulse indicates that the dual-port circuit is ready to receive data, given the correct ROM and device function command. If a bus master uses slew-rate control on the falling edge, it may need to pull down the line for $t_{RSTL}+t_F$ to compensate for the edge. In one or more embodiment, the $t_{RSTL}$ is no longer than 801 μs.

In one or more embodiments, after a bus master has released the line, it goes into receive mode. The one-wire bus is pulled to $V_{PUP}$ through the pullup resistor or, in the case of a special driver chip, through the active circuitry. In one or more embodiments, the one-wire bus is pulled to $V_{PUP}$ through the pullup resistor. When the threshold $V_{TH}$ is crossed, the dual-port circuit waits and then transmits a presence pulse by pulling the line low. To detect a presence pulse, the master needs to test the logical state of the one-wire line at $t_{MSP}$.

In one or more embodiments, immediately after $t_{RSTH}$ has expired, the dual-port circuit is ready for data communication. In a mixed population network, $t_{RSTH}$ may need to be extended to a minimum 48 μs at overdrive speed to accommodate other one-wire circuits or devices.

Read/Write Time Slots

Figure 9:
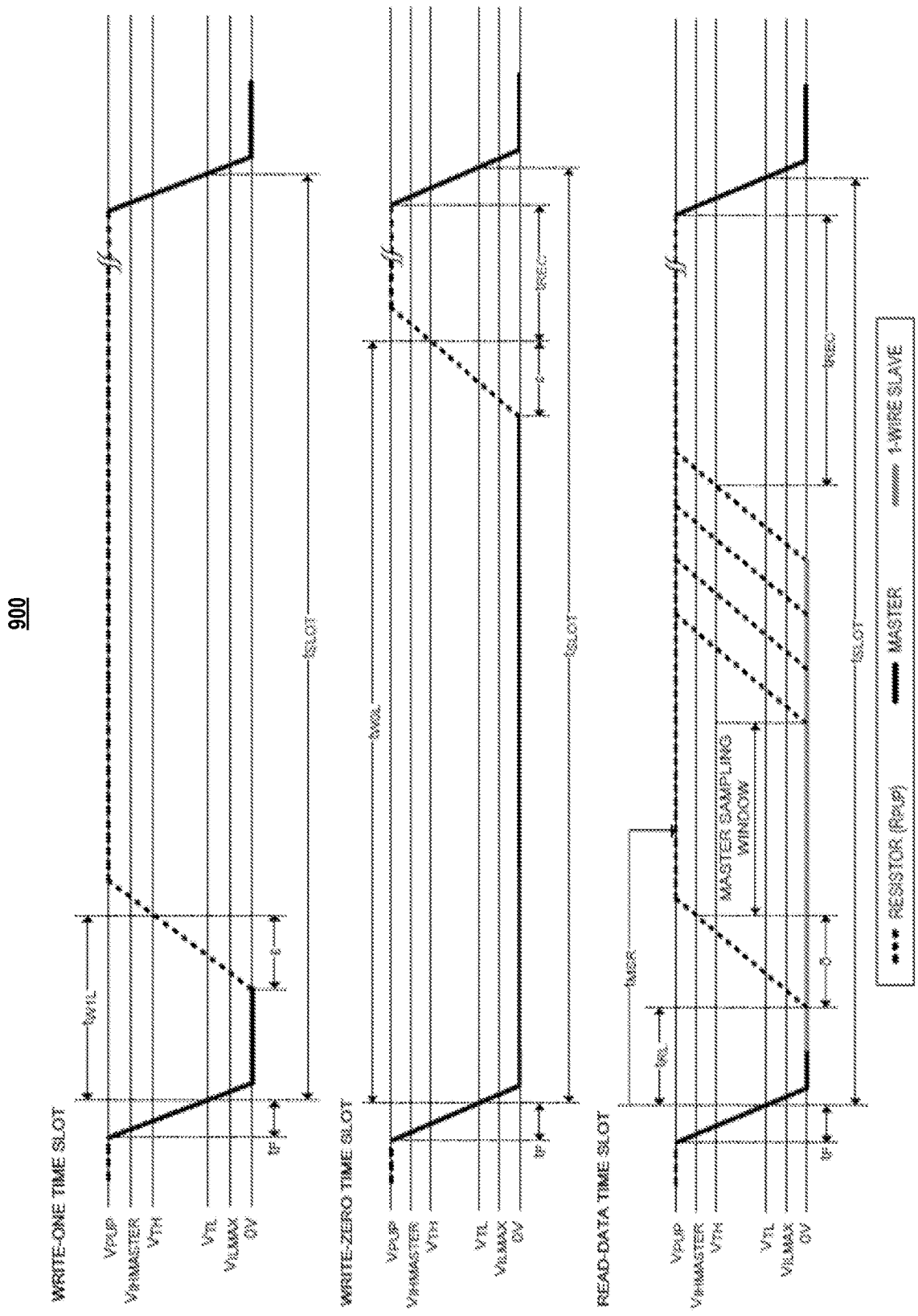
FIG. 9 depicts a diagram for read/write timing according to various embodiments of the invention.

In one or more embodiments, data communication with the dual-port circuit takes place in time slots that carry a single bit each. Write time slots transport data from bus master to slave. In read time slots, data is transferred from a slave to a master. FIG. 9 illustrates the definitions of the write and read time slots.

In one or more embodiments, communication begins with the master pulling the data line low. As the voltage on the one-wire line falls below the threshold $V_{TL}$, the dual-port circuit starts its internal timing generator that determines when the data line is sampled during a write time slot and how long data is valid during a read time slot.

Master-to-Slave

In one or more embodiments, for a write-one time slot, the voltage on the data line needs to cross the $V_{TH}$ threshold before the write-one low time $t_{W1LMAX}$ is expired. For a write-zero time slot, the voltage on the data line needs to stay below the $V_{TH}$ threshold until the write-zero low time $t_{WOLMIN}$ is expired. For the most reliable communication, the voltage on the data line should not exceed $V_{ILMAX}$ during the entire $t_{W0L}$ or $t_{W1L}$ window. After the $V_{TH}$ threshold has been crossed, the dual-port circuit needs a recovery time $t_{REc}$ before it is ready for the next time slot.

Slave-to-Master

In one or more embodiments, a read-data time slot begins like a write-one time slot. The voltage on the data line remains below $V_{TL}$ until the read low time t R L is expired. During the $t_{RL}$ window, when responding with a 0, the dual-port circuit starts pulling the data line low; its internal timing generator determines when this pulldown ends and the voltage starts rising again. When responding with a 1, the dual-port circuit does not hold the data line low at all, and the voltage starts rising as soon as $t_{RL}$ is over.

In one or more embodiments, the sum of $t_{RL}+\delta$ (rise time) on one side and the internal timing generator of the dual-port circuit on the other side define a master sampling window ($t_{MSRMIN}$ to $t_{MRSMAX}$), in which the master performs a read from the data line. In one or more embodiments, for the most reliable communication, $t_{RL}$ may need to be as short as permissible, and the master may need to read close to, but no later than $t_{MSRMAX}$. After reading from the data line, the master waits until $t_{SLOT}$ is expired. This may guarantee sufficient recovery time $t_{REC}$ for the dual-port circuit to get ready for the next time slot. It shall be noted that $t_{REC}$ specified herein applies only to a single dual-port circuit attached to a one-wire line. For multi-device configurations, $t_{REC}$ may need to be extended to accommodate the additional one-wire circuit or device input capacitance. Alternatively, an interface that performs active pullup during the one-wire recovery time such as the special one-wire line drivers can be used.

One-Wire ROM Commands

Figure 11:
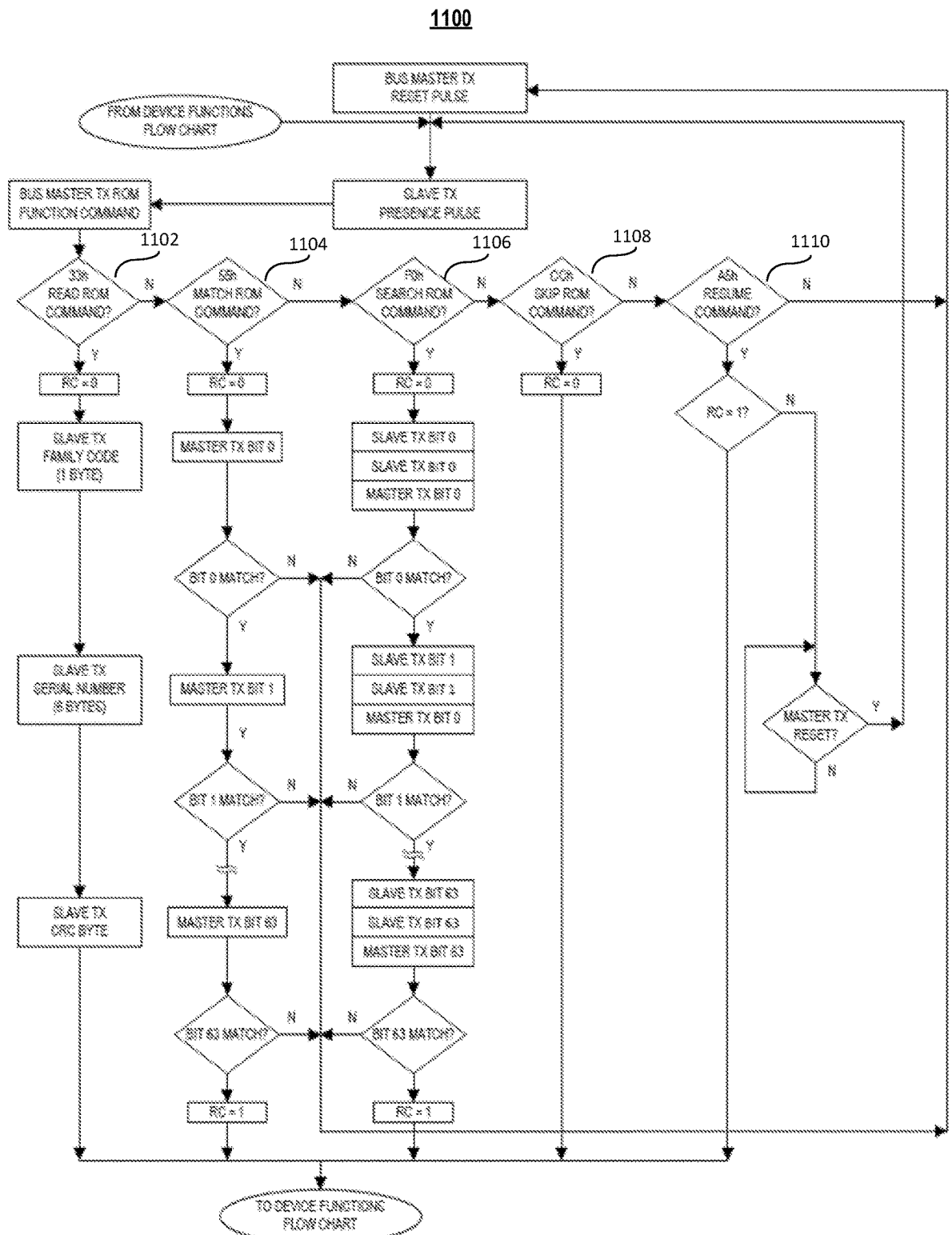
FIG. 11 depicts an exemplary process diagram for ROM function command flow for one-wire applications according to various embodiments of the invention.
Figure 12:
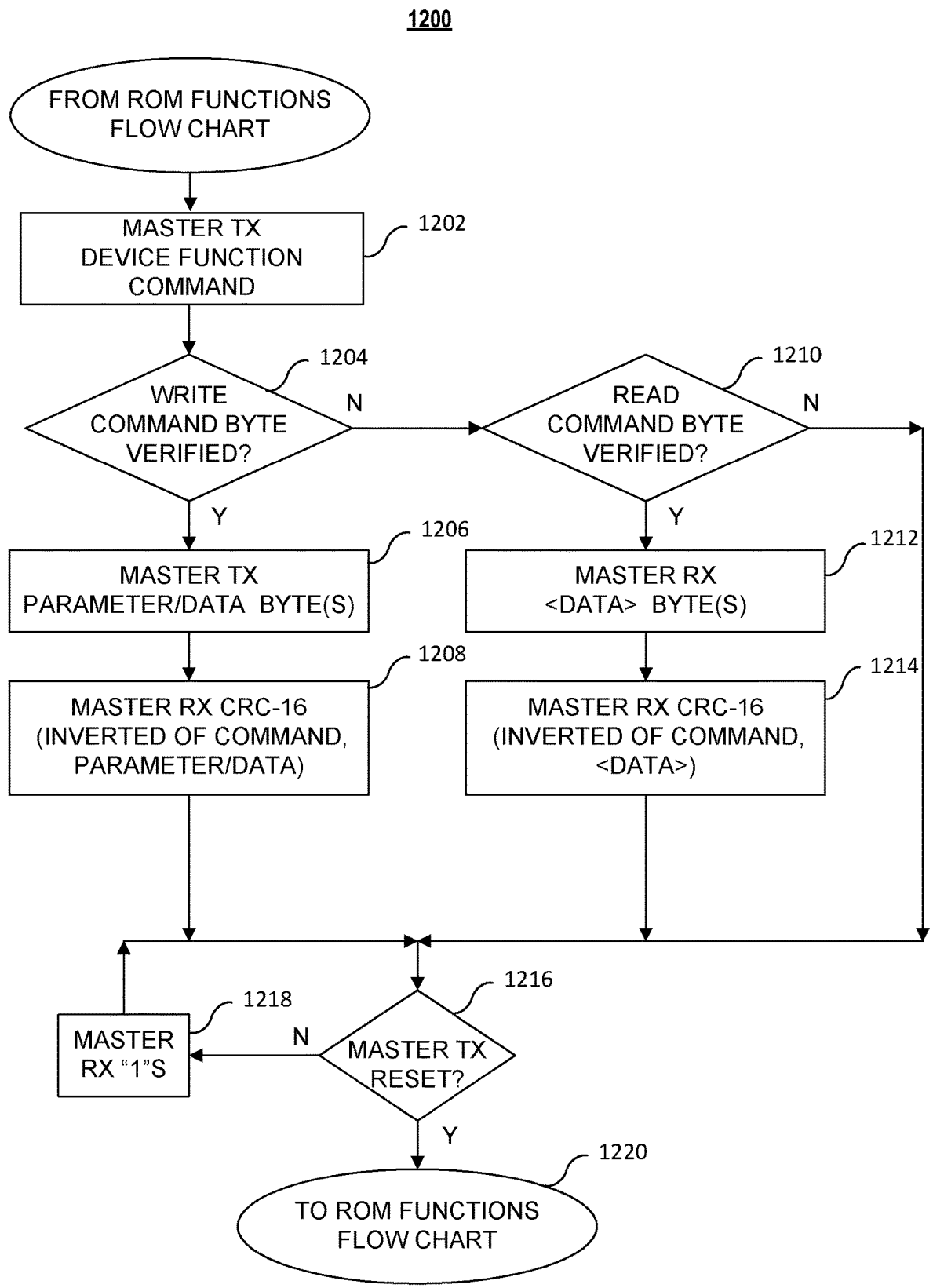
FIG. 12 depicts a process diagram for device function command flow for one-wire applications according to various embodiments of the invention.

In one or more embodiments, once a bus master has detected a presence, it may issue one or more ROM function commands that the dual-port circuit supports. In one or more embodiments, the ROM function commands are 8 bits long. FIG. 11 shows an exemplary ROM function flow process according to one or more embodiments of the present invention. The process comprises determining issuance of read ROM command 1102, determining issuance of match ROM command 1104, determining issuance of search ROM command 1106, determining issuance of skip ROM command 1108 and determining issuance of resume command 1110. A descriptive list of these ROM function commands in FIG. 11 follows in the subsequent sections and the commands are summarized in Table 18 shown below.

TABLE 18

One-wire ROM Commands Summary

| ROM FUNCTION COMMAND | DESCRIPTION |
| --- | --- |
| Search ROM | Search for a device |
| Read ROM | Read ROM from device (single drop) |
| Match ROM | Select a device by ROM number |
| Skip ROM | Select only device on one-wire |
| Resume | Selected device with RC bit set |
| Overdrive Skip ROM | Put all devices in overdrive |
| Overdrive Match ROM | Put the device with the ROM in overdrive |

Search ROM: When a system is initially brought up, the bus master might not know the number of devices on the one-wire bus or their ROM ID numbers. By taking advantage of the wired-AND property of the bus, the master can use a process of elimination to identify the ID of all slave devices. For each bit in the ID number, starting with the least significant bit, the bus master issues a triplet of time slots. On the first slot, each slave device participating in the search outputs the true value of its ID number bit. On the second slot, each slave device participating in the search outputs the complemented value of its ID number bit. On the third slot, the master writes the true value of the bit to be selected. All slave devices that do not match the bit written by the master stop participating in the search. If both of the read bits are zero, the master knows that slave devices exist with both states of the bit. By choosing which state to write, the bus master branches in the search tree. After one complete pass, the bus master knows the ROM ID number of a single device. Additional passes identify the ID numbers of the remaining devices.

Read ROM: The Read ROM command allows the bus master to read ROM information, e.g. an 8-bit family code, a unique 48-bit serial number, and an 8-bit CRC from a ROM integrated within the dual-port circuit. This command may only be used if there is a single slave on the bus. If more than one slave is present on the bus, a data collision occurs when all slaves try to transmit at the same time (open drain produces a wired-AND result). The resultant family code and 48-bit serial number result in a mismatch of the CRC.

Match ROM: The Match ROM command, followed by a 64-bit ROM sequence, allows the bus master to address a specific dual-port circuit on a multi-drop bus. Only the dual-port circuit that exactly matches the 64-bit ROM sequence responds to the subsequent device function command. All other slaves wait for a reset pulse. This command can be used with a single device or multiple devices on the bus.

Skip ROM: This command may save time in a single-drop bus system by allowing the bus master to access the device functions without providing the 64-bit ROM ID. If more than one slave is present on the bus and, for example, a read command is issued following the Skip ROM command, data collision occurs on the bus as multiple slaves transmit simultaneously (open-drain pulldowns produce a wired-AND result).

Resume: To maximize the data throughput in a multi-drop environment, the Resume command is available. This command checks the status of the RC bit and, if it is set, directly transfers control to the device function commands, similar to a Skip ROM command. One way to set the RC bit is through successfully executing the Match ROM, Search ROM, or Overdrive-Match ROM command. Once the RC bit is set, the device can repeatedly be accessed through the Resume command. Accessing another device on the bus clears the RC bit, preventing two or more devices from simultaneously responding to the Resume command.

Device Function Commands

Figure 13:
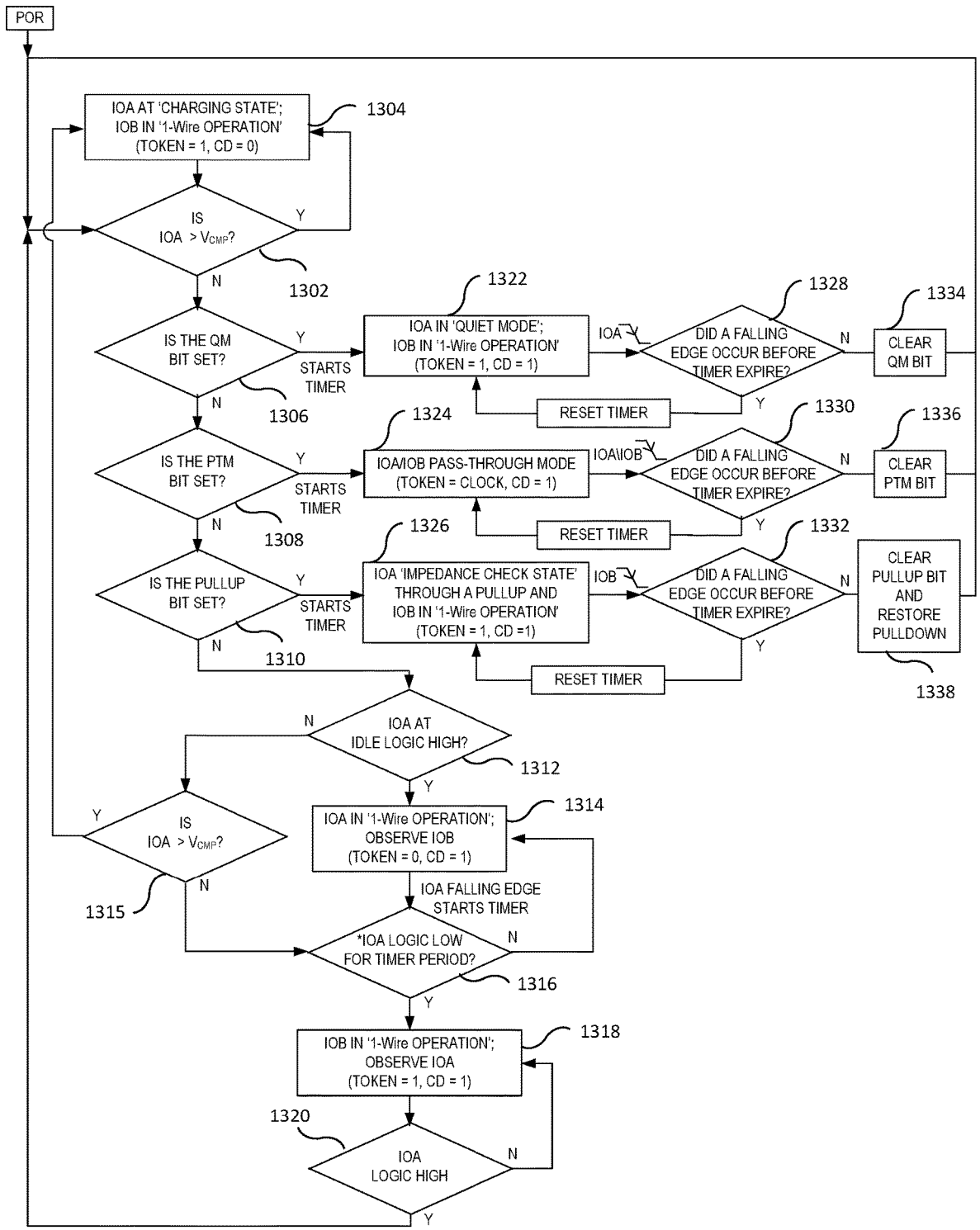
FIG. 13 depicts a state diagram for the operation of the dual-port circuit according to various embodiments of the invention.

After a 1-Wire Reset/Presence cycle and ROM function command sequence is successful, a device function command can be accepted. FIG. 13 depicts a process diagram for device function command flow for one-wire applications according to various embodiments of the invention. A descriptive list of these device function commands in FIG. 13 follows in the subsequent sections after the summarization in Table 1 shown above.

FIG. 13 is a process diagram for device function command flow for one-wire applications according to various embodiments of the invention. The process starts from ROM function flow chart, which may be described in FIG. 11. At step 1202, a master (device or circuit) transmits a device function command. At step 1204, the write command byte verification is checked. In response to verification affirmation (Y), the process goes to step 1206, wherein the master transmits one or more parameter/data bytes. Following that, the mater receives CRC-16 (the inverted of command, and parameter/data) at step 1208.

In response to no verification (N) for step 1204, the process goes to step 1210, where the read command byte verification is checked. In response to a verification affirmation (Y) for step 1210, the process goes to step 1212, wherein the mater receives one or more data bytes. Following that, the mater receives CRC-16 (the inverted of command, and data) at step 1214.

In response to no verification (N) for step 1210, or following step 1208 or step 1214, the process goes to step 1216, wherein master transmit reset is checked. If no for master transmit reset, the process goes to step 1218 with the master receiving one or more "1"s and then goes back to step 1216 for master transmit reset checking again. If yes for the master transmit reset, the process goes to ROM function flow chart in step 1220.

State Diagram

Given aforementioned description, a state diagram for the operation of the dual-port circuit is shown in FIG. 13, according to one or more embodiments of the invention. The state diagram starts from a power on reset (POR). At step 1302, verification is made on whether a charging supply is present at the IOA link. The verification may be implemented by comparing whether the voltage on the IOA link is larger than a threshold voltage $V_{CMP}$ (e.g. 4V). In response to a yes, the process goes to step 1304, wherein the IOA link is set as "charging state" and the IOB link is set in one-wire operation (by setting the token pin as high "1", the CD pin set as low "0"), and then goes back to step 1302 for verification again.

In response to no charging supply present at the IOA link, the process goes to step 1306, wherein verification is made on whether the QM bit is set. If yes, the process goes to step 1322, wherein the IOA link is set in a "quiet mode" with the QM bit set as 1 and a timer beginning to monitor IOA pin for activity, and the IOB link is set in a one-wire operation (by setting the token pin high and the CD pin high). Following step 1322, the process goes to one-wire communication on IOA link, during which verification is made in step 1328 on whether a falling edge occurred before the time expires. In response to timer expiration before receiving another IOA falling edge, the process goes to step 1334 with the QM bit cleared and then goes back to step 1302. In response to IOA falling edge before timer expiration, the process goes to timer resetting and then back to step 1322.

If no from step 1306, the process goes to step 1308, wherein verification is made on whether the pass through mode (PTM) bit is set. If yes, the process goes to step 1324, wherein the IOA/IOB link is set in a "pass through mode" with the Token pin outputs a clock and the CD pin set as high. Following step 1324, the process goes to pass through communication on IOA/IOB links, during which verification is made in step 1330 on whether a falling edge occurred before a timer for the pass through mode expires. In response to timer expiration before receiving another IOA or IOB falling edge, the process goes to step 1336 with the PTM bit cleared and then goes back to step 1302. In response to IOA or IOB falling edge before timer expiration, the process goes to timer resetting and then back to step 1324.

If no from step 1308, the process goes to step 1310, wherein verification is made on whether the pull up bit is set. If yes, the process starts a timer and goes to step 1326, wherein the IOA link is set in an "impedance check state" via a pullup and the IOB link is set in one-wire operation (with the token pin set as 1 and the CD pin set as 1). Following step 1326, the process goes to one-wire communication on IOB link, during which verification is made in step 1332 on whether a falling edge occurred before a timer for the IOB one-wire communication expires. In response to timer expiration before receiving another IOB falling edge, the process goes to step 1338 with the pullup is cleared and pulldown is restored, and then goes back to step 1302. In response to IOB falling edge before timer expiration, the process goes to timer resetting and then back to step 1326.

If no from step 1310, the process goes to step 1312, wherein verification is made on whether the IOA link is on idle logic high. If yes for step 1312, the process goes to step 1314, wherein the IOA link is set in a "one-wire operation" (with the token pin set as 0 and the CD pin set as 1). If no for step 1312, the process goes to step 1315 to verify whether a charging supply is present at the IOA link. The verification may be implemented by comparing whether the voltage on the IOA link is larger than a threshold voltage $V_{CMP}$ (e.g. 4V). In response to a yes to step 1315, the process goes back to step 1304. In response to a no to step 1315, the process goes to step 1306. Following step 1314, the timer begins on a falling edge on the IOA link. In step 1316, verification is made on whether IOA is logic low for the entire timer period. In response to IOA at logic low during the entire timer period in 1316, the process goes to step 1318 with the IOB link is set in one-wire operation and the IOA link is under observation (by setting the token pin as 1 and the CD pin set as 1), and then goes to step 1320, wherein the verification is made on whether the IOA link is on logic high. In response to IOA not at logic low during the entire timer period in 1316, the process goes to step 1314. In response to the IOA link at logic high for step 1320, the process goes back to the beginning at step 1302. In response to the IOA link not at logic high for step 1320, the process goes back to the step 1318 for continuing one-wire operation on the IOB link.

Improved Network Behavior

In one or more embodiments, in a one-wire environment, line termination is possible during transients controlled by the bus master (one-wire driver). One-wire networks, therefore, are susceptible to noise of various origins. Depending on the physical size and topology of the network, reflections from end points and branch points can add up or cancel each other to some extent. Such reflections are visible as glitches or ringing on the one-wire communication line. Noise coupled onto the one-wire line from external sources may also result in signal glitch. A glitch during the rising edge of a time slot may cause a slave device to lose synchronization with the master and, consequently, result in a Search ROM command coming to a dead end or cause a device-specific function command to abort.

Figure 14:
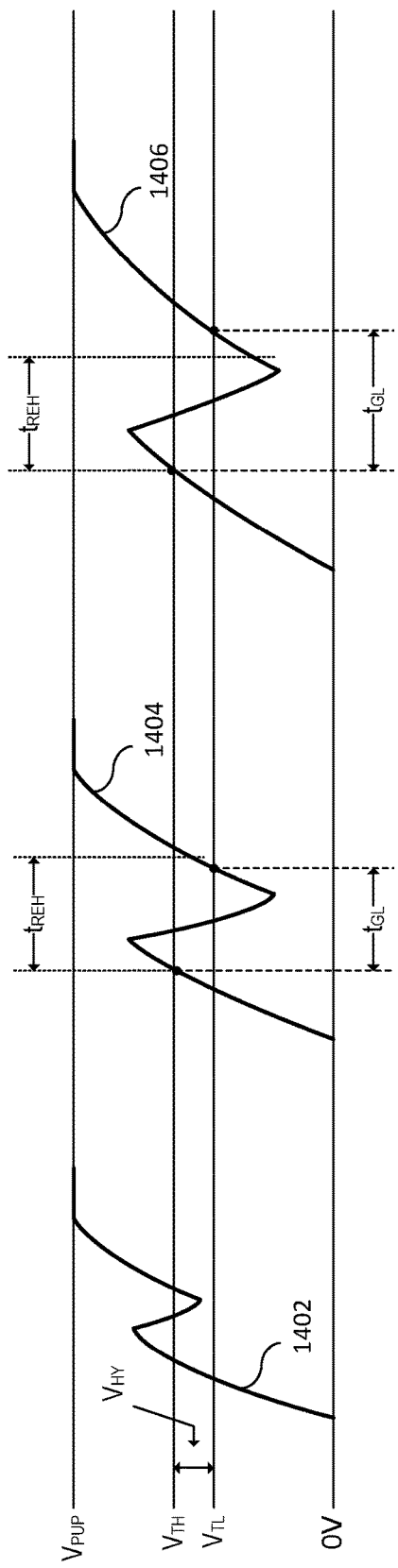
FIG. 14 depicts a noise suppression scheme according to various embodiments of the invention.

For better performance in network applications, the dual-port circuit uses a one-wire front end that is less sensitive to noise. In one or more embodiments, the IOA/IOB one-wire front-end has hysteresis, and a rising edge hold off delay. FIG. 14 depicts a noise suppression scheme according to various embodiments of the invention.

On the low-to-high transition, if the line rises above $V_{TH}$ but does not go below $V_{TL}$, the glitch is filtered, as shown in line 1402 in the figure. The rising edge hold-off delay (nominally 100 ns), $t_{REH}$, filters glitches that go below $V_{TL}$ before $t_{REH}$ has expired, as shown in line 1404. Effectively the device does not see the initial rise, and the $t_{REH}$ delay resets when the line goes below $V_{TL}$. If the line goes below $V_{TL}$ after $t_{REH}$ has expired the glitch is not filtered and is taken as the beginning of a new time slot, as shown in line 1406.

In one or more embodiments, independent of the time slot, the falling edge of the presence pulse has a controlled slew rate to reduce ringing. The falling delay may be specified by $t_{FPD}$.

Embodiments of the present invention may be implemented in various application, including but not limited to TWS earbuds and charger box, communication bridge between two hosts, dual controlled general purpose input/output ports, low-voltage single-rail level translation with tracking ID, and charger power across 1-wire bus use cases, etc. Benefits of the implementation may include the enablement of advanced TWS Features while maintaining two contact solution, detecting earbuds insertion into a charger box, capable of deriving power from the one-wire IOA link, power-on-presence pulse detection and 64-bit Identification Number (ROM ID) available for reading upon insertion when charging state disabled, detection of a dead battery in the charger box by earbuds, available GPIO pins for optional features in accessories, capable of passing status information between charging box and earbuds, pass through mode for fast firmware updates between hosts up-to 512 kbps, charger detection pin indicator of 5V on one-wire IOA pin for charger power available switching, minimum dual 1-Wire Interface for low cost and interface complexity, capable of operation in a multi-voltage system, communication to dual hosts with two digital signals each at 90 kbps, high ESD immunity due to one-wire IOA pin, etc.

In one or more embodiments, regarding the power-on-presence pulse detection, a power-on-presence function may be maintained by detecting if a charging power is present at the first one-wire link (IOA). If a charging power is applied to IOA, the device (e.g. an earbud) integrating with the dual-port one-wire circuit may skip its power-up presence; otherwise it will generate a power-on-presence when the device is put into a charging box.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

The invention claimed is:

1. A dual-port circuit for single wire communication, comprising:
    a first interface to communicate with a first circuit via a first single wire link, in response to a voltage on the first single wire link being higher than a predetermined threshold voltage, a charging activity using the voltage on the first single wire link is enabled, the predetermined threshold voltage is higher than an operation voltage on the first single wire link for data communication;
    a second interface to communicate with a second circuit via a second single wire link, one of the first single wire link and the second single wire link is enabled at a given time for single wire data communication, the first interface and the second interface establish, upon activation, a bidirectional level translation between the first single wire link and the second single wire link in a pass through mode; and
    a buffer in communication with the first single wire link and the second single wire links for data transfer data during single wire data communication.

2. The dual-port circuit of claim 1 wherein in the pass through mode, communication between the first interface and the second interface supports a simplex or half duplex universal asynchronous receiver/transmitter (UART) communication.

3. The dual-port circuit of claim 2 wherein the bidirectional level translation is accomplished by alternatively engaging two inverter gate paths between the first interface and the second interface.

4. The dual-port circuit of claim 1 wherein the pass through mode is timer enabled.

5. The dual-port circuit of claim 1 wherein enablement of the first single wire link or the second single wire link for single wire data communication is controlled by a token pin, when the token pin is set to a first logic level, the first single wire link is set for single wire data communication, when the token pin is set to a second logic level opposite to the first logic level, the second single wire link is set for single wire data communication.

6. The dual-port circuit of claim 5 wherein the token pin outputs a clock signal in the pass through mode.

7. The dual-port circuit of claim 1 wherein the charging activity comprises coupling a voltage source to a battery charger, the battery charger is configured to charge at least one battery.

8. The dual-port circuit of claim 7 wherein the voltage source comprises a charging battery.

9. The dual-port circuit of claim 8 wherein the charging battery has a battery capacity greater than a battery capacity of the at least one battery.

10. A method for bridging single wire communications, comprising:
    coupling a first interface of a dual-port circuit to a first circuit via a first single wire link;
    coupling a second interface of the dual-port circuit to a second circuit via a second single wire link;
    coordinating operation of the first single wire link and the second single wire link by enabling one of the first single wire link and the second single wire link for single wire data communication at a given time, a buffer is in communication with the first and second single wire links and is configured to transfer data during single wire data communication; and upon activation, establishing a bidirectional level translation between the first single wire link and the second single wire link in a pass through mode;
    wherein in response to a voltage on the first single wire link being higher than a predetermined threshold voltage, enabling charging activity using the voltage on the first single wire link, the predetermined threshold voltage is higher than an operation voltage on the first single wire link for data communication.

11. The method of claim 10 wherein in the pass through mode, communication between the first interface and the second interface supports a simplex or half duplex universal asynchronous receiver/transmitter (UART) communication.

12. The method of claim 11 wherein enablement of the first single wire link or the second single wire link for single wire data communication is controlled by a token pin, when the token pin is set to a first logic level, the first single wire link is set for single wire communication, when the token pin is set to a second logic level opposite to the first logic level, the second single wire link is set for single wire communication.

13. The method of claim 12 wherein in the pass through mode, the token pin outputs a clock signal.

14. A system for single wire communication comprising:
a first circuit comprising a first input/output interface for communication via a first single wire link, in response to a voltage on the first single wire link being higher than a predetermined threshold voltage, a charging activity using the voltage on the first single wire link is enabled, the predetermined threshold voltage is higher than an operation voltage on the first single wire link for data communication;
a second circuit comprising a second input/output interface for communication via a second single wire link;
a dual-port circuit coupled between the first circuit and the second circuit, the dual-port circuit comprises a first interface to communicate with a first circuit via the first single wire link, a second interface to communicate with the second circuit via the second single wire link, one of the first single wire link and the second single wire link is enabled at a given time for single wire data communication, upon activation, the first interface and the second interface establish a bidirectional level translation between the first circuit and the second circuit in a pass through mode; and
a buffer in communication with the first and second single wire links and configured to transfer data during single wire communication.

15. The system of claim 14 wherein the buffer and the dual-port circuit are integrated within a single chip.

16. The system of claim 15 wherein the single chip and the second circuit are incorporated together into a single device.

17. The system of claim 16 wherein the single device is a true wireless stereo (TWS) earbud.

18. The system of claim 17 wherein the first circuit is a microcontroller integrated inside a charging box for the TWS earbud.

19. The system of claim 17 wherein the TWS earbud detects if a charging power is present at the first single wire link when the TWS earbud is placed within a charge box, in response to the charging power is applied to first single wire link, the TWS earbud skips a power-up presence.

* * * * *